United States Patent
Yabu

(10) Patent No.: US 10,851,237 B2
(45) Date of Patent: Dec. 1, 2020

(54) BLOCK COPOLYMER, MULTILAYERED STRUCTURE, SOLID POLYMER MEMBRANE, FUEL CELL, METHOD FOR PRODUCING MULTILAYERED STRUCTURE, AND METHOD FOR PRODUCING MULTILAYERED STRUCTURE INCLUDING INORGANIC NANOPARTICLES

(71) Applicant: JAPAN SCIENCE AND TECHNOLOGY AGENCY, Kawaguchi (JP)

(72) Inventor: Hiroshi Yabu, Sendai (JP)

(73) Assignee: JAPAN SCIENCE AND TECHNOLOGY AGENCY, Kawaguchi (JP)

(*) Notice: Subject to any disclaimer, the term of this patent is extended or adjusted under 35 U.S.C. 154(b) by 1 day.

(21) Appl. No.: 16/321,083

(22) PCT Filed: Aug. 1, 2017

(86) PCT No.: PCT/JP2017/027793
§ 371 (c)(1),
(2) Date: Jan. 28, 2019

(87) PCT Pub. No.: WO2018/025828
PCT Pub. Date: Feb. 8, 2018

(65) Prior Publication Data
US 2019/0169420 A1   Jun. 6, 2019

(30) Foreign Application Priority Data
Aug. 5, 2016 (JP) ................. 2016-154294

(51) Int. Cl.
| | | |
|---|---|---|
| C08L 53/00 | (2006.01) |
| H01M 8/02 | (2016.01) |
| H01M 8/10 | (2016.01) |
| C08F 293/00 | (2006.01) |
| C08F 8/12 | (2006.01) |

(Continued)

(52) U.S. Cl.
CPC .............. *C08L 53/005* (2013.01); *C08F 8/12* (2013.01); *C08F 293/005* (2013.01); *C08J 7/06* (2013.01); *H01M 8/02* (2013.01); *H01M 8/0228* (2013.01); *H01M 8/10* (2013.01); *H01M 8/1004* (2013.01); *B82Y 30/00* (2013.01); *B82Y 40/00* (2013.01); *C08F 299/022* (2013.01); *C08F 2438/03* (2013.01); *C08J 2323/02* (2013.01);
(Continued)

(58) Field of Classification Search
CPC ... C08L 53/005; C09D 153/00; C09D 153/05; C08F 212/24
See application file for complete search history.

(56) References Cited

U.S. PATENT DOCUMENTS

2008/0171836 A1   7/2008  Lee
2012/0301809 A1   11/2012  Mitsuta et al.
(Continued)

FOREIGN PATENT DOCUMENTS

JP   2004-062044 A   2/2004
JP   2010-501027 A   1/2010
(Continued)

OTHER PUBLICATIONS

Fuji Photo, electronic translation of JP 2004-062044, Feb. 2004.*
(Continued)

*Primary Examiner* — Jeffrey C Mullis

(57) ABSTRACT

The problem addressed by the present invention is to provide a block copolymer that can be used in a neutral solvent atmosphere and can produce a solid polymer membrane including nanoparticles.
The problem is solved by a block copolymer represented by formula (1) below.

[Chemical formula 1]

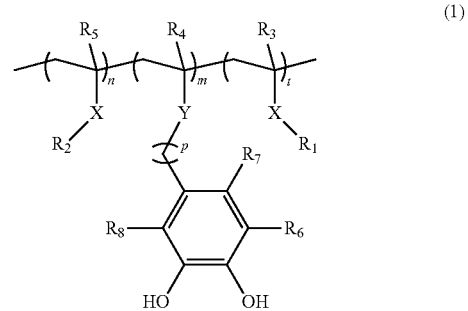

(1)

wherein in the formula, $R_1$ represents a C1-20 linear, branched, or cyclic alkyl group, C6-20 aryl group, or C7-20 aralkyl group; $R_2$ represents a group having a functional group having an acid dissociation constant pKa of from 0.5 to 7; $R_3$, $R_4$, and $R_5$ each show H or a C1-20 linear, branched, or cyclic alkyl group; $R_6$, $R_7$, and $R_8$ each represent a hydrogen, hydroxyl group, nitro group, carboxy group, or carbonyl group; X represents an amide or ester, but may not be included; Y represents an amide or ester, but may not be included; p represents an integer of 1-10, but may not be included; n represents an integer of 3-1000; m represents an integer of 3-1000; and t represents an integer of 3-1000, but n may not be included; the arrangement of n, m, and t is arbitrary, but n and m are adjacent when n is included.

27 Claims, 8 Drawing Sheets

(51) Int. Cl.

| | |
|---|---|
| C08J 7/06 | (2006.01) |
| H01M 8/0228 | (2016.01) |
| H01M 8/1004 | (2016.01) |
| C09D 153/00 | (2006.01) |
| B82Y 30/00 | (2011.01) |
| B82Y 40/00 | (2011.01) |
| C08F 299/02 | (2006.01) |
| H01M 8/0221 | (2016.01) |

(52) U.S. Cl.
CPC ......... *C08J 2325/06* (2013.01); *C09D 153/00* (2013.01); *H01M 8/0221* (2013.01); *Y02P 70/50* (2015.11)

(56) References Cited

U.S. PATENT DOCUMENTS

| | | |
|---|---|---|
| 2015/0021180 A1 | 1/2015 | Higuchi et al. |
| 2017/0008993 A1 | 1/2017 | Yabu et al. |

FOREIGN PATENT DOCUMENTS

| | | |
|---|---|---|
| JP | 5765692 B2 | 8/2015 |
| WO | 2011/096355 A1 | 8/2011 |
| WO | 2015/129846 A1 | 9/2015 |

OTHER PUBLICATIONS

Yuta Saito et al., "Silver Nanoparticle Arrays Prepared by In Situ Automatic Reduction of Silver Ions in Mussel-Inspired Block Copolymer Films," Macromolecular Chemistry and Physics, vol. 217, No. 6, pp. 726-734, Mar. 24, 2016, Wiley-VCH Verlag GmbH & Co. KGaA, Weinheim.

International Preliminary Report on Patentability issued in corresponding PCT Application No. PCT/JP2017/027793, dated Feb. 5, 2019, 10 pages.

Hiroshi Yabu, "Synthesis of Catechol-Containing Random/Block Copolymers and Their Applications," Journal of Society of Materials Engineering for Resources of Japan, vol. 27, No. 1/2, pp. 1-5 (Mar. 2016). Josmer Japan.

Yuta Saito et al., "Control of Microphase Separated Structures of Catechol-Containing Block Copolymers and Formation of Metal Nanoarrays," Polymer Preprints, Japan, 64th SPSJ Annual Meeting, vol. 64, No. 1, 2 pages (May 2015), The Society of Polymer Science, Japan.

Yuta Saito et al., "Synthesis of Block Copolymers having Catechol Groups: and Evaluation of Their Microphase-Separated Structures," Polymer Preprints, Japan, 63rd SPSJ Symposium on Macromolecules, vol. 63, No. 2, pp. 7828-7829 (2014), The Society of Polymer Science, Japan.

Yuta Saito et al., "Preparation of Block Copolymer Having Catechol groups and Fabrication of Metal Nanoparticles with Organic Solvent Dispersibility," Polymer Preprints, Japan, 63rd SPSJ Annual Meeting, vol. 63, No. 1, pp. 2741-2742 (2014), The Society of Polymer Science, Japan.

Hiroshi Yabu, "Amphipathic Polymers that Mimic Mussel Adhesive Protein, and the Adhesive/Interface-Controlling Functions thereof," Convertech, vol. 43, Issue 5, pp. 26-29 (May 2015).

Hiroshi Yabu, "Synthesis of Catechol-Group-Containing Biomimetic Polymers, and their Applications," Proceedings of the Joint Meeting of the Tohoku Area Chemistry Societies, p. 41 (2014).

Hiroyuki Oshima et al., "Solubilizing Various Nanoparticles using Catechol-Group-Containing Amphipathic Polymers," Proceedings of the Joint Meeting of the Tohoku Area Chemistry Societies, p. 190 (2014).

Yuta Saito et al., "Synthesis of poly(dihydroxystyrene-block-styrene) (PDHSt-b-PSt) by the RAFT process and preparation of organic-solvent-dispersive Ag NPs by automatic reduction of metal ions in the presence of PDHSt-b-PSt," Chemical Communication, vol. 51, Issue 18, pp. 3743-3746 (2015), The Royal Society of Chemistry.

* cited by examiner

BLOCK COPOLYMER, MULTILAYERED STRUCTURE, SOLID POLYMER MEMBRANE, FUEL CELL, METHOD FOR PRODUCING MULTILAYERED STRUCTURE, AND METHOD FOR PRODUCING MULTILAYERED STRUCTURE INCLUDING INORGANIC NANOPARTICLES

CROSS REFERENCE TO RELATED APPLICATIONS

This patent application is a U.S. national stage application under 35 U.S.C. § 371 of International Patent Application No. PCT/JP2017/027793 filed on Aug. 1, 2017, which claims the benefit of foreign priority to Japanese Patent Application No. JP 2016-154294 filed on Aug. 5, 2016. The International Application was published in Japanese on Feb. 8, 2018, as International Publication No. WO 2018/025828 A1 under PCT Article 21(2).

STATEMENT REGARDING PRIOR DISCLOSURES BY THE INVENTOR OR A JOINT INVENTOR

This patent application contains subject matter that was previously disclosed by the inventor in an electronic publication on Feb. 9, 2016, titled "Silver Nanoparticle Arrays Prepared by In Situ Automatic Reduction of Silver Ions in Mussel-Inspired Block Copolymer Films," in *Macromolecular Chemistry and Physics*, 2016, 217, 726-734, DOI: 10.1002/macp.201500504, made available at http://onlinelibrary.wiley.com/doi/10.1002/macp.201500504/asbtract.

1. FIELD OF THE INVENTION

The present invention relates to a block copolymer, a multilayered structure, a solid polymer membrane, a fuel cells, a method for producing a multilayered structure, and a method for producing a multilayered structure including inorganic nanoparticles.

2. DESCRIPTION OF THE RELATED ART

A fuel cell is a device in which hydrogen and oxygen are caused to undergo a chemical reaction to generate electricity. The energy efficiency is high, and virtually no environmental pollutants are discharged. Fuel cells are therefore expected to find ever wider use as a new power generation system that takes into consideration the global environment. A fuel cell includes as components an anode electrode to which a fuel gas is supplied, a cathode electrode to which an oxidant gas is supplied, and a solid polymer membrane provided between the electrodes that conducts protons from the anode electrode to the cathode electrode.

Nafion® is known as a solid polymer membrane that conducts protons, among the above components. Nafion is a sulfonated tetrafluoroethylene copolymer. Since the sulfonate groups grafted to the ends of the polytetrafluoroethylene skeleton chain have a negative charge, positively charged proton groups move easily between them, and the proton conductivity increases.

After having been developed in the 1960s, Nafion has been blended with various other polymers, and stability, etc., has been improved; therefore, there are many examples of using Nafion as the solid polymer membrane of a fuel cell. However, a problem is presented in that Nafion is strongly acidic because of the sulfonate groups and cannot be used in a neutral solvent atmosphere (see Patent Document 1).

To solve this problem, polymer films are known in which proton conduction is possible in a neutral solvent atmosphere using a film of an organic/metal hybrid polymer comprising one or more metal ions selected from the group of Fe ions, Co ions, Ru ions, Zn ions, and Ni ions; and bis(terpyridyl)benzene (see Patent Document 1).

Causing noble metal nanoparticles having excellent water retention to be contained in the elements that constitute the anode electrode and cathode electrode is also described in the field of fuel cells (see Patent Document 2).

PRIOR ARTS LIST

Patent Document

[Patent Document 1] Japanese Patent No. 5765692
[Patent Document 2] WO 2011/096355

SUMMARY OF THE INVENTION

Problems Solved by the Invention

Polymer films capable of proton conduction in a neutral solvent atmosphere are known, as described in Patent Document 1. Causing nanoparticles to be contained in the elements constituting the fuel cell is also known to improve the performance of the components, as described in Patent Document 2. An example described in Patent Document 2 discloses noble metal nanoparticles having excellent water retention contained in the elements that constitute the anode electrode and cathode electrode.

However, since the solid polymer membrane is disposed between the anode electrode and cathode electrode and current flows, it is thought that the nanoparticles will be moved by the current if nanoparticles such as a metal are contained in the solid polymer membrane. Therefore, although there are many examples of causing nanoparticles to be contained in elements that constitute the anode electrode and cathode electrode as described in Patent Document 2, causing nanoparticles to be contained in the solid polymer membrane is not known. Even in Patent Document 1, one or more complex metal ions selected from the group of Fe ions, Co ions, Ru ions, Zn ions, and Ni ions are contained in the polymer film. No solid polymer membrane that can be used in a neutral solvent atmosphere and contains nanoparticles is currently known.

To solve the above problems, the present invention was contrived through thoroughgoing studies, via which the following was newly discovered and the present invention perfected:

(i) a block copolymer including a hydrophilic segment that includes a catechol group, a hydrophobic segment including a more hydrophobic substitution than the hydrophilic segment that includes a catechol group, and, included as needed, a hydrophilic segment including a functional group having an acid dissociation constant pKa of from 0.5 to 7, for example, the block copolymer represented by the following chemical formula (1), (ii) includes hydrophilic segments and hydrophobic segments and thus can produce a multilayered structure by being dissolved in an organic solvent and cast, and (iii) can, when the multilayered structure produced is immersed in a solution including an inorganic ion, produce nanoparticles upon the catechol groups of the multilayered structure reducing the inorganic ion, (iv) it being possible for the block copolymer, being weakly acidic to neutral, to provide a solid polymer membrane that includes inorganic nanoparticles and can be used in a neutral solvent atmosphere.

[Chemical formula 1]

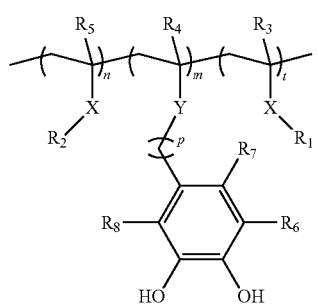

(1)

wherein in the formula, $R_1$ represents a C1-20 linear, branched, or cyclic alkyl group, C6-20 aryl group, or C7-20 aralkyl group; $R_2$ represents a group having a functional group having an acid dissociation constant pKa of from 0.5 to 7; $R_3$, $R_4$, and $R_5$ each show H or a C1-20 linear, branched, or cyclic alkyl group; $R_6$, $R_7$, and $R_8$ each represent a hydrogen, hydroxyl group, nitro group, carboxy group, or carbonyl group; X represents an amide or ester, but may not be included; Y represents an amide or ester, but may not be included; p represents an integer of 1-10, but may not be included; n represents an integer of 3-1000; m represents an integer of 3-1000; and t represents an integer of 3-1000, but n may not be included; the arrangement of n, m, and t is arbitrary, but n and m are adjacent when n is included.

Specifically, it is an object of the present invention to provide a block copolymer that can be used to produce a solid polymer membrane including nanoparticles, a multilayered structure produced from the block copolymer, a solid polymer membrane produced from the multilayered structure, a fuel cell including the solid polymer membrane, a method for producing a multilayered structure, and a method for producing a multilayered structure including inorganic nanoparticles.

Means for Solving the Problems

The present invention relates to the following, which are shown below: a block copolymer, a multilayered structure, a solid polymer membrane, a fuel cell, a method for producing a multilayered structure, and a method for producing a multilayered structure including inorganic nanoparticles.

[1] A block copolymer represented by formula (1) below.

[Chemical formula 2]

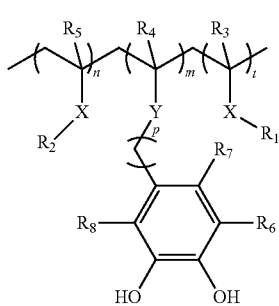

(1)

wherein in the formula, $R_1$ represents a C1-20 linear, branched, or cyclic alkyl group, C6-20 aryl group, or C7-20 aralkyl group; $R_2$ represents a group having a functional group having an acid dissociation constant pKa of from 0.5 to 7; $R_3$, $R_4$, and $R_5$ each show H or a C1-20 linear, branched, or cyclic alkyl group; $R_6$, $R_7$, and $R_8$ each represent a hydrogen, hydroxyl group, nitro group, carboxy group, or carbonyl group; X represents an amide or ester, but may not be included; Y represents an amide or ester, but may not be included; p represents an integer of 1-10, but may not be included; n represents an integer of 3-1000; m represents an integer of 3-1000; and t represents an integer of 3-1000, but n may not be included; the arrangement of n, m, and t is arbitrary, but n and m are adjacent when n is included.

[2] The block copolymer according to [1] above, wherein m, n, and t are such that m+n/m+n+t=0.2-0.8.

[3] The block copolymer according to [1] or [2] above, wherein n is included.

[4] A multilayered structure wherein the hydrophilic segments represented by m and n and the hydrophobic segment represented by t of the block copolymer according to any of [1]-[3] above have a microlayer-separated layer structure.

[5] The multilayered structure according to [4] above, wherein a thickness of the multilayered structure is from 20 nm to 500 nm.

[6] The multilayered structure according to [4] or [5] above, wherein the microlayers having hydrophilic segments include inorganic nanoparticles.

[7] The multilayered structure according to [6] above, wherein the hydrophilic segments include a catechol group and quinone.

[8] A solid polymer membrane for a separator of a fuel cell including the multilayered structure according to any of [4]-[7] above.

[9] A fuel cell including the solid polymer membrane according to [8] above, an anode electrode, and a cathode electrode.

[10] A method for producing a multilayered structure including
a step that dissolves a block copolymer represented by formula (1) below in an organic solvent to prepare a block copolymer solution,
a casting step that casts the block copolymer solution,
a multilayered structure production step that produces the multilayered structure in which hydrophilic segments represented by m and n and hydrophobic segment represented by t of the block copolymer are microlayer-separated by evaporating off the solvent of the cast block copolymer solution.

[Chemical formula 3]

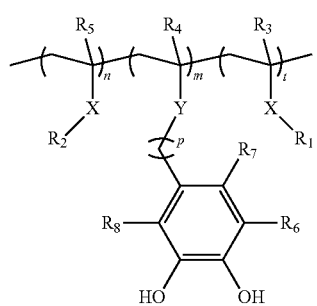

(1)

wherein in the formula, $R_1$ represents a C1-20 linear, branched, or cyclic alkyl group, C6-20 aryl group, or C7-20 aralkyl group; $R_2$ represents a group having a functional group having an acid dissociation constant pKa of from 0.5 to 7; $R_3$, $R_4$, and $R_5$ each show H or a C1-20 linear, branched, or cyclic alkyl group; $R_6$, $R_7$, and $R_8$ each represent a hydrogen, hydroxyl group, nitro group, carboxy group, or carbonyl group; X represents an amide or ester, but may not be included; Y represents an amide or ester, but may not be included; p represents an integer of 1-10, but may not be included; n represents an integer of 3-1000; m represents an integer of 3-1000; and t represents an integer of 3-1000, but n may not be included; the arrangement of n, m, and t is arbitrary, but n and m are adjacent when n is included.

[11] The method for producing the multilayered structure according to [10] above, wherein n is included.

[12] A method for producing a multilayered structure including inorganic nanoparticles that includes an immersion step for immersing the multilayered structure produced by the production method according to [10] or [11] above in a solution that includes an inorganic ion, an inorganic nanoparticle production step in which the inorganic ion is reduced by the catechol groups of segments represented by m of the multilayered structure and inorganic nanoparticles are produced in microlayers that include segments represented by m.

[13] A block copolymer including a hydrophilic segment including a catechol group, a hydrophobic segment including a substitution more hydrophobic than the hydrophilic segment including a catechol group, and, included as needed, a hydrophilic segment including a functional group having an acid dissociation constant pKa of from 0.5 to 7, in which the hydrophilic segment including the functional group having an acid dissociation constant pKa of from 0.5 to 7, when included, is adjacent to the hydrophilic segment including the catechol group.

[14] The block copolymer according to [13] above, wherein the hydrophilic segment including the functional group having the acid dissociation constant pKa of from 0.5 to 7 is included.

[15] A multilayered structure in which the hydrophilic segments and hydrophobic segments of the block copolymer according to [13] or [14] above have a microlayer-separated layer structure.

[16] The multilayered structure according to [15] above, wherein a thickness of the multilayered structure is from 20 nm to 500 nm.

[17] The multilayered structure according to [15] or [16] above, wherein microlayers having hydrophilic segments include inorganic nanoparticles.

[18] The multilayered structure according to [17] above, wherein the hydrophilic segments include a catechol group and quinone.

[19] A solid polymer membrane for a separator of a fuel cell including the multilayered structure according to any of [15]-[18] above.

[20] A fuel cell including the solid polymer membrane according to [19] above, an anode electrode, and a cathode electrode.

Advantages of the Invention

By virtue of having a hydrophilic segment including a catechol group and a hydrophobic segment, the block copolymer of the present invention can produce a microlayer-separated multilayered structure and can produce a solid polymer membrane including inorganic nanoparticles by reducing an inorganic ion via the catechol groups. In addition, by having side chains in the weakly acidic to neutral region, the block copolymer can provide a solid polymer membrane that can be used in a neutral solvent atmosphere and includes inorganic nanoparticles.

BRIEF DESCRIPTION OF THE DRAWINGS

FIG. 8(A) represents the infrared absorption spectrum of a multilayered structure including Ag nanoparticles in a dry state; FIG. 8(B) represents the infrared spectrum of a multilayered structure including Ag nanoparticles in a moist state; and FIG. 8(C) represents the wavelengths attributable to each molecule;

FIG. 11(A) is a TEM photograph of a multilayered structure including Ag nanoparticles before supplying current to the electrodes; FIG. 11(B) is a TEM photograph of a multilayered structure including Ag nanoparticles after supplying current;

DESCRIPTION OF THE PREFERRED EMBODIMENTS

Figure 1:
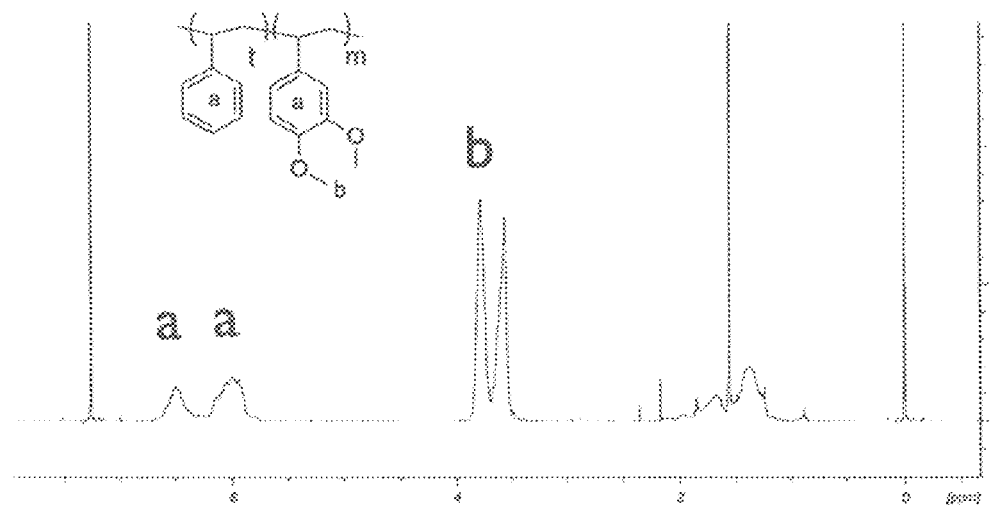
FIG. 1 shows the NMR measurement results of a block copolymer synthesized in Example 1.

The block copolymer, multilayered structure, solid polymer membrane, fuel cell, method for producing a multilayered structure, and method for producing a multilayered structure including inorganic nanoparticles of the present invention are described more specifically below.

The block copolymer of the present invention includes a hydrophilic segment including a catechol group, a hydrophobic segment including a more hydrophobic substitution than the hydrophilic segment including a catechol group, and, included if necessary, a hydrophilic segment including a functional group having an acid dissociation constant pKa of from 0.5 to 7, and is represented, for example, by formula (1) below.

[Chemical formula 4]

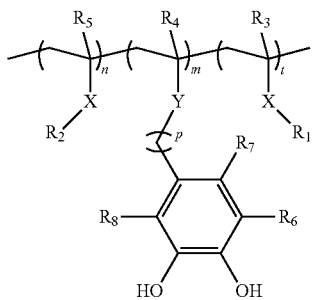

(1)

In the block copolymer represented by formula (1), $R_1$ represents a C1-20 linear, branched, or cyclic alkyl group, C6-20 aryl group, or C7-20 aralkyl group. In the block copolymer, the t segment including $R_1$ functions as a hydrophobic segment. Therefore, $R_1$ may be relatively more hydrophobic than the catechol group of the hydrophilic segments (m segment and n segment) discussed below, but the number of carbon atoms in $R_1$ is preferably 3 or more.

Specific examples of C1-20 linear, branched, or cyclic alkyl groups include methyl, ethyl, n-propyl, 2-propyl, n-butyl, 1-methylpropyl, 2-methylpropyl, tert-butyl, n-pentyl, 1-methylbutyl, 1-ethylpropyl, tert-pentyl, 2-methylbutyl, 3-methylbutyl, 2,2-dimethylpropyl, n-hexyl, 1-methylpentyl, 1-ethylbutyl, 2-methylpentyl, 3-methylpentyl, 4-methylpentyl, 2-methylpentan-3-yl, 3,3-dimethylbutyl, 2,2-dimethylbutyl, 1,1-dimethylbutyl, 1,2-dimethylbutyl, 1,3-dimethylbutyl, 2,3-dimethylbutyl, 1-ethylbutyl, 2-ethylbutyl, heptyl, octyl, nonyl, decyl, undecyl, dodecyl, tridecyl, tetradecyl, pentadecyl, hexadecyl, heptadecyl, octadecyl, nonadecyl, eicosyl, cyclopropyl, cyclobutyl, cyclopentyl, or cyclohexyl. C1-12 alkyl groups are preferred among the abovementioned alkyl groups.

Specific examples of C6-20 aryl groups include phenyl, indenyl, pentalenyl, naphthyl, azulenyl, fluorenyl, phenanthrolenyl, anthracenyl, acenaphthylenyl, biphenylenyl, naphthacenyl, or pyrenyl.

Specific examples of C7-20 aralkyl groups include benzyl, phenethyl, 1-phenylpropyl, 2-phenylpropyl, 3-phenylpropyl, 1-phenylbutyl, 2-phenylbutyl, 3-phenylbutyl, 4-phenylbutyl, 1-phenylpentylbutyl, 2-phenylpentylbutyl, 3-phenylpentylbutyl, 4-phenylpentylbutyl, 5-phenylpentylbutyl, 1-phenylhexylbutyl, 2-phenylhexylbutyl, 3-phenylhexylbutyl, 4-phenylhexylbutyl, 5-phenylhexylbutyl, 6-phenylhexylbutyl, 1-phenylheptyl, 1-phenyloctyl, 1-phenylnonyl, 1-phenyldecyl, 1-phenylundecyl, 1-phenyldodecyl, 1-phenyltridecyl, or 1-phenyltetradecyl.

$R_2$ represents a functional group having an acid dissociation constant (sometimes referred to hereinafter as "pKa") of from 0.5 to 7, preferably less than 4. As will be discussed below, the n segment including $R_2$ is not essential but can impart weak acidity when a solid polymer membrane produced from the copolymer represented by formula (1) is used in a fuel cell. A pKa of less than 0.5 is undesirable because acidity is overly strong and instability results. A pKa of more than 7 is also undesirable because dissociation of protons is suppressed and the catechol groups may quinonize.

Examples of functional groups that satisfy the above pKa include —OH (hydroxyl group), —COOH (carboxyl group), —SH (thiol group), —$H_2PO_4$ (phosphate group), and —$SO_3H$ (sulfonate group). Examples of $R_2$ include the above functional groups or a group in which at least one hydrogen of a C1-20 linear, branched, or cyclic alkyl group, C6-20 aryl group, or C7-20 aralkyl group has been substituted by the above functional group. Specific examples of C1-20 linear, branched, or cyclic alkyl groups, C6-20 aryl groups, or C7-20 aralkyl groups are the same as for $R_1$. Furthermore, all $R_2$ of the n segment of the block copolymer need not be groups having a functional group that satisfies the above pKa, and some may have protecting groups remaining or may be unsubstituted, as discussed below.

$R_3$, $R_4$, and R; each represent H or a C1-20 linear, branched, or cyclic alkyl group; preferably H or a C1-5 alkyl group; more preferably H or a C3 or less linear alkyl group; even more preferably H or $CH_3$.

$R_6$, $R_7$, and $R_8$ each represent a hydrogen, hydroxyl group, nitro group, carboxy group, or carbonyl group.

X represents an amide or ester, but may not be included.
Y represents an amide or ester, but may not be included.
p represents 0 or an integer of 1-10, preferably 0 or an integer of 1-5, more preferably 0 or an integer of 1-3, even more preferably 2.

n represents an integer of 3-1000, m represents an integer of 3-1000, and t represents an integer of 3-1000, but n may not be included. The arrangement of n, m, and t is arbitrary, but when n is included, hydrophilic n and m segments must be adjacent to produce a microlayer-separated multilayered structure. In other words, examples of the block copolymer of the present invention include, in order of polymerization, a t-m block copolymer, m-t block copolymer, t-m-n block copolymer, t-n-m block copolymer, n-m-t block copolymer, and m-n-t block copolymer. Furthermore, if the hydrophilic n and m segments are adjacent, the block copolymer is not limited to the above diblock copolymers and triblock copolymers; the block copolymer may be a multi-component copolymer such as a t-n-m-n block copolymer. When n is 0, the block copolymer can be represented by the following formula.

[Chemical formula 5]

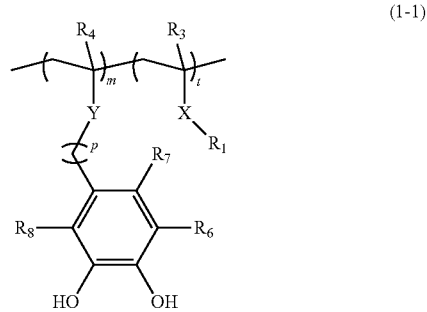

(1-1)

The multilayered structure of the present invention can be produced by microlayer-separation of the hydrophilic segments represented by m and n and the hydrophobic segment represented by t of the block copolymer by casting a block copolymer solution dissolved in an organic solvent and drying. When the multilayered structure is used as a solid polymer membrane for the separator of a fuel cell, protons must conduct from the anode electrode direction to the cathode electrode direction in the solid polymer membrane. Therefore, the individual layers that constitute the multilayered structure are preferably continuous. The layer structure of the multilayered structure is not particularly restricted as long as the individual layers are continuous; examples include a lamellar structure (alternating layering of hydrophilic layers and hydrophobic layers), hexagonal structure (a hydrophobic layer covers the circumference of a hydrophilic tubular body layer or a hydrophilic layer covers the circumference of a hydrophobic tubular body layer), and co-continuous structure (hydrophilic layers connect infinitely in three directions and the circumference is covered by a hydrophobic layer or hydrophobic layers connect infinitely in three directions and the circumference is covered by a hydrophilic layer).

To produce a multilayered structure in which the individual layers are continuous as described above, it is preferable that $m+n/m+n+t=0.2-0.8$, more preferably 0.25-0.6. When $m=n/m+n+t$ is less than 0.2, it becomes difficult to produce a continuous multilayered structure because a reverse micelle structure in which the hydrophilic segments form beads on the inside and the hydrophobic segments face outside is formed in the organic solvent. In addition, when $m+n/m+n+t$ is more than 0.8, conversely to above, it becomes difficult to produce a continuous multilayered structure because a micelle structure in which the hydrophobic segments form beads on the inside and the hydrophilic segments face outside is formed in the organic solvent. When $m+n/m+n+t$ is 0.2 or higher, a hexagonal structure in which hydrophobic layers cover the circumference of a layer of a hydrophilic tubular body is formed first. Then, as the proportion of hydrophilic segments increases, a co-continuous structure in which hydrophilic layers are connected in three directions and a lamellar structure form. As the proportion of hydrophilic segments increases further, a co-continuous structure in which hydrophobic layers are connected in three directions and a hexagonal structure in which hydrophilic layers cover the circumference of a layer of a hydrophobic tubular body form.

When m is less than 3, there are few catechol groups to reduce the inorganic ion, which is undesirable because it becomes difficult to obtain inorganic nanoparticles. Since the size of the inorganic nanoparticles obtained also increases as the m segments become longer, the size of the inorganic nanoparticles may be adjusted as desired by, for example, making m 5 or higher, 10 or higher, or 15 or higher. On the other hand, when m is greater than 1000, there is a possibility that a crosslinked body will be formed due to the strong interactions between molecules, which is undesirable because the block copolymer will be poorly soluble in organic solvents. m may be set, for example, at 800 or less or 500 or less, taking into consideration the solubility and the desired inorganic nanoparticle size. n and t may be selected as is appropriate within the range of 3-1000 so that $m+n/m+n+t=0.2-0.8$ depending on the size of m.

The block copolymer represented by the above formula (1) is not particularly restricted as long as the block copolymer can be synthesized so as to include m, n, and t segments. The block copolymer may be synthesized using known synthesis methods. For example, the block copolymer can be produced in an organic solvent including a compound (sometimes referred to hereinafter as a "RAFT agent") used in the reversible addition-fragmentation chain transfer (RAFT) reaction represented by formula (2) below by (a) a step for conducting living radical polymerization of a radical-polymerizable hydrophobic vinyl monomer (t segment) represented by formula (3), (b) a step for conducting living radical polymerization of a radical-polymerizable hydrophilic vinyl monomer (m segment) represented by formula (4), (c) a step for conducting living radical polymerization of a radical-polymerizable vinyl monomer (n segment) represented by formula (5), and (d) a step for deprotecting $R_{12}$ and $R_{13}$ of the living polymer obtained and forming hydroxyl groups. Furthermore, the arrangement of n, m, and t is arbitrary, as described above, but n and m are adjacent when n is included. Therefore, the order of the steps described in (a)-(c) above may be changed as appropriate.

[Chemical formula 6]

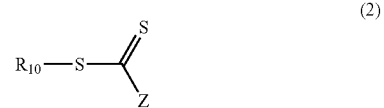

(2)

In formula (2), $R_{10}$ represents a C1-18 linear, branched, or cyclic alkyl group, C2-18 alkenyl group, C6-18 monovalent aromatic hydrocarbon group, or monovalent heterocyclic group having a total of 3-18 atoms selected from carbon atoms and hetero atoms selected from N, S, O, Se, and Te. Hydrogens of the above C1-18 alkyl group, C2-18 alkenyl group, C6-18 monovalent aromatic hydrocarbon group, and total of 3-18 monovalent heterocyclic group of $R_{10}$ may each be substituted by a carboxyl group, hydroxyl group, cyano group, or C1-20 alkyl group. Z represents a hydrogen atom, chlorine atom, carboxyl group, cyano group, C1-20 alkyl group, C6-20 monovalent aromatic hydrocarbon group, monovalent heterocyclic group having a total of 3-20 atoms selected from carbon atoms and hetero atoms selected from N, S, O, Se, and Te, —OH, —$SR_{11}$, —$N(R_{11})_2$, —OC(=O)$R_{11}$, —C(=O)$OR_{11}$, —C(=O)$N(R_{11})_2$, —P(=O) $(OR_{11})_2$, or —P(=O) $(R_{11})_2$. $R_{11}$ represents a C1-20 alkyl group, C3-20 monovalent aliphatic hydrocarbon group, C6-20 monovalent aromatic hydrocarbon group, monovalent heterocyclic group having a total of 3-20 atoms selected from carbon atoms and hetero atoms, —OR', —SR', —N(R')$_2$, or a monovalent group having a polymer chain. Each R' represents a C1-18 alkyl group, C2-18 alkenyl group, C6-18 monovalent aromatic hydrocarbon group, or monovalent heterocyclic group having a total of 3-18 atoms selected from carbon atoms and hetero atoms selected form N, S, O, Se, and Te. Hydrogens of the C1-20 alkyl group, C6-20 monovalent aromatic hydrocarbon group, monovalent heterocyclic group having a total atomic number of 3-20, carboxyl group, and $R_{11}$ of Z above may each be substituted by a carboxyl group, hydroxyl group, cyano group, or C1-20 alkyl group.

[Chemical formula 7]

(3)

In formula (3), $R_1$, $R_3$, and X are the same as $R_1$, $R_3$, and X in formula (1).

[Chemical formula 8]

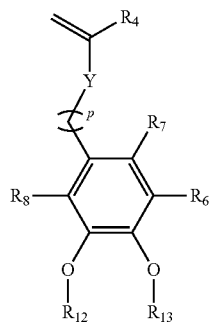

(4)

In formula (4), $R_4$, $R_6$, $R_7$, $R_8$, p, and Y are the same as $R_4$, $R_6$, $R_7$, $R_8$, p, and Y in formula (1). $R_{12}$ and $R_{13}$ represent hydroxyl group protecting groups.

The protecting groups are not particularly restricted as long as these groups protect hydroxyl groups and can be deprotected. Examples include C2-15 acyl-type protecting groups, C1-15 ether-type protecting groups, C3-15 acetal-type protecting groups, C3-15 silyl ether-type protecting groups, C7-15 aralkyl-type protecting groups, and C3-15 allyl-type protecting groups. Examples of acyl-type protecting groups include an acetyl group, pivaloyl group, and benzoyl group. Examples of ether-type protecting groups include a methyl group, benzyl group, p-methoxybenzyl group, and tert-butyl group. Examples of acetal-type protecting groups include a methoxymethyl group, 2-tetrahydropyranyl group, and ethoxyethyl group. Examples of silyl ether-type protecting groups include a trimethylsilyl group, triethylsilyl group, tert-butyldimethylsilyl group, triisopropylsilyl group, and tert-butyldiphenylsilyl group. $R_{12}$ and $R_{13}$ may be the same or different protecting groups. Furthermore, there are also cases in which some of the protecting groups remain without being deprotected in the above step (d) in which $R_{12}$ and $R_{13}$ of the living polymer obtained are deprotected and hydroxyl groups are formed. Therefore, the catechol groups of the block copolymer represented by formula (1) also include catechol groups protected by protecting groups.

[Chemical formula 9]

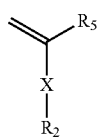

(5)

In formula (5), $R_2$, $R_5$, and X are the same as $R_2$, $R_5$, and X in formula (1). Furthermore, the functional group of $R_2$ may be protected by a protecting group. Examples of the protecting group are the same as for the protecting groups of $R_{12}$ and $R_{13}$ above.

Examples of the RAFT agent represented by formula (2) include 2-cyano-2-benzodithioate, 4-cyano-4-(phenylcarbonothioylthio)pentanoic acid, 2-cyano-2-propyldodecyltrithiocarbonate, 4-cyano-4-[(dodecylsulfanylthiocarbonyl) sulfanyl]pentanoic acid, 2-(dedecylthiocarbonothioylthio)-2-methylpropanoic acid, cyanomethyldodecyltrithiocarbonate, cyanomethylmethyl(phenyl)carbamodithioate, bis(thiobenzoyl)sulfide, bis(dodecylsulfanylthiocarbonyl)disulfide, cumyldithiobenzoate, [1-(O-ethylxanthyl)ethyl]benzene, 2-phenyl-2-propylbenzodithioate, benzylbenzodithioate, and other such dithioester compounds.

The monomer represented by formula (3) is a hydrophobic vinyl monomer. When X is an amide or ester and $R_1$ is a C1-20 linear, branched, or cyclic alkyl group, examples include alkyl (meth)acrylamides such as methyl (meth)acrylamide, ethyl (meth)acrylamide, n-propyl (meth)acrylamide, 2-propyl (meth)acrylamide, n-butyl (meth)acrylamide, 1-methylpropyl (meth)acrylamide, 2-methylpropyl (meth)acrylamide, tert-butyl (meth)acrylamide, n-pentyl (meth)acrylamide, 1-methylbutyl (meth)acrylamide, 1-ethylpropyl (meth)acrylamide, tert-pentyl (meth)acrylamide, 2-methylbutyl (meth)acrylamide, 3-methylbutyl (meth)acrylamide, 2,2-dimethylpropyl (meth)acrylamide, n-hexyl (meth)acrylamide, 1-methylpentyl (meth)acrylamide, 1-ethylbutyl (meth)acrylamide, 2-methylpentyl (meth)acrylamide, 3-methylpentyl (meth)acrylamide, 4-methylpentyl (meth)acrylamide, 2-methylpentan-3-yl (meth)acrylamide, 3,3-dimethylbutyl (meth)acrylamide, 2,2-dimethylbutyl (meth)acrylamide, 1,1-dimethylbutyl (meth)acrylamide, 1,2-dimethylbutyl (meth)acrylamide, 1,3-dimethylbutyl (meth)acrylamide, 2,3-dimethylbutyl (meth)acrylamide, 1-ethylbutyl (meth)acrylamide, 2-ethylbutyl (meth)acrylamide, heptyl (meth)acrylamide, octyl (meth)acrylamide, nonyl (meth)acrylamide, decyl (meth)acrylamide, undecyl (meth)acrylamide, dodecyl (meth)acrylamide, tridecyl (meth)acrylamide, tetradecyl (meth)acrylamide, pentadecyl (meth)acrylamide, hexadecyl (meth)acrylamide, heptadecyl (meth)acrylamide, octadecyl (meth)acrylamide, nonadecyl (meth)acrylamide, eicosyl (meth)acrylamide, cyclopropyl (meth)acrylamide, cyclobutyl (meth)acrylamide, cyclopentyl (meth)acrylamide and cyclohexyl (meth)acrylamide, and alkyl (meth)acrylates such as methyl (meth)acrylate, ethyl (meth)acrylate, n-propyl (meth)acrylate, 2-propyl (meth)acrylate, n-butyl (meth)acrylate, 1-methylpropyl (meth)acrylate, 2-methylpropyl (meth)acrylate, tert-butyl (meth)acrylate, n-pentyl (meth)acrylate, 1-methylbutyl (meth)acrylate, 1-ethylpropyl (meth)acrylate, tert-pentyl (meth)acrylate, 2-methylbutyl (meth)acrylate, 3-methylbutyl (meth)acrylate, 2,2-dimethylpropyl (meth)acrylate, n-hexyl (meth)acrylate, 1-methylpentyl (meth)acrylate, 1-ethylbutyl (meth)acrylate, 2-methylpentyl (meth)acrylate, 3-methylpentyl (meth)acrylate, 4-methylpentyl (meth)acrylate, 2-methylpentan-3-yl (meth)acrylate, 3,3-dimethylbutyl (meth)acrylate, 2,2-dimethylbutyl (meth)acrylate, 1,1-dimethylbutyl (meth)acrylate, 1,2-dimethylbutyl (meth)acrylate, 1,3-dimethylbutyl (meth)acrylate, 2,3-dimethylbutyl (meth)acrylate, 1-ethylbutyl (meth)acrylate and 2-ethylbutyl (meth)acrylate.

When X is an amide or ester and R1 is a C6-20 aryl group, examples include aryl (meth)acrylamides such as phenyl (meth)acrylamide, indenyl (meth)acrylamide, pentalenyl (meth)acrylamide, naphthyl (meth)acrylamide, azulenyl (meth)acrylamide and fluorenyl (meth)acrylamide.

When X is an amide or ester and R1 is a C7-20 aralkyl group, examples include aralkyl (meth)acrylamides such as benzyl (meth)acrylamide and aralkyl (meth)acrylates such as benzyl (meth)acrylate.

On the other hand, examples of the monomer when X is not included in formula (3) and R1 is a C1-20 linear, branched, or cyclic alkyl group include propylene, 2-methyl- 1-propylene, 1-butene, 2-methyl-1-butene, 3-methyl-1-butene, 3,3-dimethyl-1-butene, 3-methyl-2-ethyl-1-butene, 2,3-dimethyl-1-butene, 2-tert-butyl-3,3-dimethyl-1-butene, cyclopropylene, cyclobutene, cyclopentene, or cyclohexene.

Examples of the monomer when X is not included in formula (3) and R1 is a C6-20 aryl group include vinyl aryls such as vinylbenzene (styrene).

Examples of the monomer when X is not included in formula (3) and R1 is a C7-20 aralkyl group include 3-phenyl-1-propylene, 2-phenyl-1-propylene, 4-phenyl-1-butene, 3-phenyl-1-butene, 2-phenyl-1-butene, 5-phenyl-1-pentene, 4-phenyl-1-pentene, 3-phenyl-1-pentene, 2-phenyl-1-pentene, 6-phenyl-1-hexene, 5-phenyl-1-hexene, 4-phenyl-1-hexene, 3-phenyl-1-hexene, 2-phenyl-1-hexene, 7-phenyl-1-heptene, 6-phenyl-1-heptene, 5-phenyl-1-heptene, 4-phenyl-1-heptene, 3-phenyl-1-heptene, 2-phenyl-1-heptene, 8-phenyl-1-octene, 7-phenyl-1-octene, 6-phenyl-1-octene, 5-phenyl-1-octene, 4-phenyl-1-octene, 3-phenyl-1-octene, 2-phenyl-1-octene, 9-phenyl-1-nonene, 8-phenyl-1-nonene, 7-phenyl-1-nonene, 6-phenyl-1-nonene, 5-phenyl-1-nonene, 4-phenyl-1-nonene, 3-phenyl-1-nonene, 2-phenyl-1-nonene, 10-phenyl-1-decene, 9-phenyl-1-decene, 8-phenyl-1-decene, 7-phenyl-1-decene, 6-phenyl-1-decene, 5-phenyl-1-decene, 4-phenyl-1-decene, 3-phenyl-1-decene, 2-phenyl-1-decene, 11-phenyl-1-undecene, 10-phenyl-1-undecene, 9-phenyl-1-undecene, 8-phenyl-1-undecene, 7-phenyl-1-undecene, 6-phenyl-1-undecene, 5-phenyl-1-undecene, 4-phenyl-1-undecene, 3-phenyl-1-undecene, 2-phenyl-1-undecene, 12-phenyl-1-dodecene, 11-phenyl-1-dodecene, 10-phenyl-1-dodecene, 9-phenyl-1-dodecene, 8-phenyl-1-dodecene, 7-phenyl-1-dodecene, 6-phenyl-1-dodecene, 5-phenyl-1-dodecene, 4-phenyl-1-dodecene, 3-phenyl-1-dodecene, 2-phenyl-1-dodecene, 13-phenyl-1-tridecene, 12-phenyl-1-tridecene, 11-phenyl-1-tridecene, 10-phenyl-1-tridecene, 9-phenyl-1-tridecene, 8-phenyl-1-tridecene, 7-phenyl-1-tridecene, 6-phenyl-1-tridecene, 5-phenyl-1-tridecene, 4-phenyl-1-tridecene, 3-phenyl-1-tridecene, 2-phenyl-1-tridecene, 14-phenyl-1-tetradecene, 13-phenyl-1-tetradecene, 12-phenyl-1-tetradecene, 11-phenyl-1-tetradecene, 10-phenyl-1-tetradecene, 9-phenyl-1-tetradecene, 8-phenyl-1-tetradecene, 7-phenyl-1-tetradecene, 6-phenyl-1-tetradecene, 5-phenyl-1-tetradecene, 4-phenyl-1-tetradecene, 3-phenyl-1-tetradecene, 2-phenyl-1-tetradecene, and the like. In addition, these monomers may be used in combination with other organic monomers.

Examples of monomers represented by formula (4), when $R_6$, $R_7$, and $R_8$ are hydrogen, include monomers obtained by protecting monomers including a catechol group given as examples below by the above protecting groups. In protection by protecting groups, each protecting group may be protected by a known method.

When Y is an amide, examples include N-[2-(3,4-dihydroxyphenyl)methyl] (meth)acrylamide, N-[2-(3,4-dihydroxyphenyl)ethyl] (meth)acrylamide (dopamine (meth)acrylamide), N-[2-(3,4-dihydroxyphenyl)propyl](meth)acrylamide, N-[2-(3,4-dihydroxyphenyl)butyl](meth)acrylamide, N-[2-(3,4-dihydroxyphenyl)pentyl](meth)acrylamide, N-[2-(3,4-dihydroxyphenyl)hexyl](meth)acrylamide, N-[2-(3,4-dihydroxyphenyl)heptyl](meth)acrylamide, N-[2-(3,4-dihydroxyphenyl)octyl](meth)acrylamide, N-[2-(3,4-dihydroxyphenyl)nonyl](meth)acrylamide, and N-[2-(3,4-dihydroxyphenyl)decyl](meth)acrylamide.

When Y is an ester, examples include N-[2-(3,4-dihydroxyphenyl)methyl] (meth)acrylate, N-[2-(3,4-dihydroxyphenyl)ethyl] (meth)acrylate (dopamine (meth)acrylate), N-[2-(3,4-dihydroxyphenyl)propyl](meth)acrylate, N-[2-(3,4-dihydroxyphenyl)butyl](meth)acrylate, N-[2-(3,4-dihydroxyphenyl)pentyl](meth)acrylate, N-[2-(3,4-dihydroxyphenyl)hexyl](meth)acrylate, N-[2-(3,4-dihydroxyphenyl)heptyl](meth)acrylate, N-[2-(3,4-dihydroxyphenyl)octyl](meth)acrylate, N-[2-(3,4-dihydroxyphenyl)nonyl](meth)acrylate, and N-[2-(3,4-dihydroxyphenyl)decyl](meth)acrylate.

When Y is not included, examples include 3,4-dihydroxystyrene, 3-(3,4-dihydroxyphenyl)-1-propene, 4-(3,4-dihydroxyphenyl)-1-butene, 5-(3,4-dihydroxyphenyl)-1-pentene, 6-(3,4-dihydroxyphenyl)-1-hexene, 7-(3,4-dihydroxyphenyl)-1-heptene, 8-(3,4-dihydroxyphenyl)-1-octene, 9-(3,4-dihydroxyphenyl)-1-nonene, 10-(3,4-dihydroxyphenyl)-1-decene, 3-(3,4-dihydroxyphenyl)-2-methyl-1-propene, 4-(3,4-dihydroxyphenyl)-2-methyl-1-butene, 5-(3,4-dihydroxyphenyl)-2-methyl-1-pentene, 6-(3,4-dihydroxyphenyl)-2-methyl-1-hexene, 7-(3,4-dihydroxyphenyl)-2-methyl-1-heptene, 8-(3,4-dihydroxyphenyl)-2-methyl-1-octene, 9-(3,4-dihydroxyphenyl)-2-methyl-1-nonene, and 10-(3,4-dihydroxyphenyl)-2-methyl-1-decene.

The monomers shown above are specific examples of when $R_6$, $R_7$, and $R_8$ are hydrogen, but monomers represented by formula (4) may have substituents introduced into one or more of $R_6$, $R_7$ and $R_8$. That is, a group in which a hydrogen of a catechol group has been substituted by a substituent may be included in a side chain. Examples of substituents include a hydroxyl group, nitro group, carboxy group, and carbonyl group. When multiple substituents are introduced, the same groups may be introduced or different groups may be introduced.

Monomers derived from dopa or derivatives thereof are preferred in terms of performance and ease of manufacture as specific examples of monomers represented by formula (4), and those derived from dopa are more preferred for ease of availability. Here, those derived from dopa or derivatives thereof means those in which p=2 among those represented by formula (4), preferably those derived from dopa for ease of manufacture. Specifically, it means those that can be synthesized from dopa (3,4-dihydroxyphenylalanine), more preferably dopamine (meth)acrylamide or dopamine (meth)acrylate, and even more preferably dopamine (meth)acrylamide for ease of manufacture.

Examples of monomers represented by formula (5) include monomers in which a hydrogen of a monomer given as an example in formula (3) above has been substituted by a functional group having a pKa of from 0.5 to 7, for example, —OH (hydroxyl group), —COOH (carboxyl group), —SH (thiol group), —$H_2PO_4$ (phosphate group), and —$SO_3H$ (sulfonate group). Substitution by a functional group may be a single substitution or multiple substitutions. In the case of multiple substitutions, substitution may be by the same functional groups or by different functional groups. Alternatively, $R_2$ may be the functional group. The functional group may also be protected by a protecting group, and deprotection may be performed at the same time as that of $R_{12}$ and $R_{13}$ after block copolymer synthesis when a monomer protected by protecting groups is used. Specific examples of monomers represented by formula (5) include methyl methacrylate, butyl methacrylate, and styrene sulfonic acid tosyl ester. Furthermore, since functional groups may be oxidized depending on the type of deprotecting agent during the course of deprotection of the protecting groups ($R_{12}$ and $R_{13}$), the monomer represented by formula (5) is preferably methyl methacrylate or styrene sulfonic acid tosyl ester which generate carboxylic acid or sulfonic acid. Some of the protecting groups may also remain without being deprotected.

Examples of the organic solvent for producing the block copolymer represented by formula (1) include aliphatic hydrocarbons such as hexane, heptane, cyclohexane and mineral terpenes; ethers such as diethyl ether, tetrahydrofuran, dioxane, diphenyl ether, anisole and dimethoxybenzene; amides such as N,N-dimethylformamide and N,N-dimethylacetamide; nitriles such as acetonitrile, propionitrile and benzonitrile; ester compounds or carbonate compounds such as acetone, methyl ethyl ketone, methyl isobutyl ketone, ethyl acetate, butyl acetate, ethylene carbonate and propylene carbonate; alcohols such as methanol, ethanol, propanol, isopropanol, n-butyl alcohol, t-butyl alcohol and isoamyl alcohol; aromatic hydrocarbons such as benzene and toluene; halogenated hydrocarbons such as chlorobenzene, methylene chloride, chloroform, chlorobenzene and benzotrifluoride.

Radical polymerization initiators for living radical polymerization (RAFT polymerization) of monomers represented by formulas (3) through (5) are not particularly restricted as long as the monomers can be radical polymerized. Examples include peroxides such as hydrogen peroxide, isobutyl peroxide, t-butyl peroxide, octanoyl peroxide, decanoyl peroxide, lauroyl peroxide, benzoyl peroxide, potassium persulfate, ammonium persulfate and sodium persulfate; azo compounds such as azobisisobutyronitrile (AIBN), 2,2'-azobis(4-methoxy-2,4-dimethylvaleronitrile), 2,2'-azobis(2-cyclopropylpropionitrile), 2,2'-azobis(2-methylpropionitrile) and 2,2'-azobis(2-methylbutyronitrile); redox initiators such as hydrogen peroxide-ascorbic acid, hydrogen peroxide-ferrous chloride and persulfate-sodium bisulfite; and the like. The amount of radical polymerization initiator used is usually 0.01-1 mol, preferably about 0.1-0.5 mol, per mole of RAFT agent.

A deprotecting agent that accords with the protecting group used may be used as the deprotecting agent. For example, deprotection can be performed by a strong Lewis acid such as boron tribromide in the case of a methyl group; palladium-catalyzed hydrogenation or batch reduction in the case of a benzyl group; oxidizing conditions by 2,3-dicyano-5,6-dichloro-p-benzoquinone or cerium ammonium nitrate in addition to the same conditions as for a benzyl group in the case of a p-methoxybenzyl group; strong acidic conditions such as trifluoroacetic acid or 4 mol/L hydrochloric acid-ethyl acetate solution in the case of a tert-butyl group; reaction with water under acidic conditions in the case of a methoxymethyl group, 2-tetrahydropyranyl group, ethoxyethyl group, or other such acetal system; potassium carbonate in methanol in the case of an acetyl group; stronger basic conditions than for an acetyl group in the case of a pivaloyl group; strong basic conditions or strong hydride reduction conditions in the case of a benzoyl group; acidic conditions or the action of fluoride ion in the case of a trimethylsilyl, triethylsilyl, tert-butyldimethylsilyl, triisopropylsilyl, tert-butyldiphenylsilyl, or other such silyl ether system.

An example of a specific method for producing the block copolymer of the present invention is as in the following steps.

(e) A RAFT agent represented by formula (2), a hydrophobic vinyl monomer represented by formula (3), and a radical polymerization initiator such as azobisisobutyronitrile are dissolved in an organic solvent such as dioxane and frozen and degassed using liquid nitrogen or the like. Next, this solution is heated to 50-100° C. and subjected to living radical polymerization. A polymer including segments in which the monomer of formula (3) has been polymerized is obtained by adding the reacted solution dropwise to hexane or the like, removing the unreacted monomer by centrifugation, and vacuum drying.

(f) The polymer obtained in the above (e), a vinyl monomer represented by formula (4), and a radical polymerization initiator such as azobisisobutyronitrile are placed in an organic solvent such as dioxane and frozen and degassed. Next, this solution is heated to 50-100° C. and subjected to living radical polymerization. A polymer including segments in which the monomer of formula (4) has been polymerized is obtained by adding the reacted solution dropwise to hexane or the like, removing the unreacted monomer by centrifugation, and vacuum drying.

(g) The polymer obtained in the above (f), a vinyl monomer represented by formula (5), and a radical polymerization initiator such as azobisisobutyronitrile are placed in an organic solvent such as dioxane and frozen and degassed. Next, this solution is heated to 50-100° C. and subjected to living radical polymerization. A precursor block copolymer including segments in which the monomer of formula (5) has been polymerized so as to be adjacent to segments in which the monomer of formula (4) has been polymerized in which the catechol groups of the block copolymer of the present invention are protected by protecting groups is obtained by adding the reacted solution dropwise to hexane or the like, removing the unreacted monomer by centrifugation, and vacuum drying.

The length of each segment in which monomers represented by formulas (3) through (5) have been polymerized can be controlled by adjusting the amount of monomer added to the organic solvent and the reaction time.

The above block copolymer is a block copolymer synthesized in the order: segment in which the monomer represented by formula (3) has been polymerized, segment in which the monomer represented by formula (4) has been polymerized, and segment in which the monomer represented by formula (5) has been polymerized. However, the segment order can be rearranged by rearranging the above steps (e) through (g).

Then, after the above steps (e) through (g), a block copolymer of the present invention can be obtained by (h) dissolving the block copolymer obtained in an organic solvent such as dichloromethane and deprotecting $R_{12}$ and $R_{13}$ using reagents that accord with the protecting groups used to form hydroxy groups.

Furthermore, living radical polymerization (RAFT polymerization) is one example of a method for producing a block copolymer represented by formula (1) from monomers represented by formulas (3), (4), and (5), but other methods may be used as long as a block copolymer can be synthesized thereby. Examples include anionic polymerization and atom transfer radical polymerization.

The block copolymers shown below are examples of block copolymers obtained by the above method. Furthermore, the m segments of the following block copolymers all show examples including catechol groups, but, as was mentioned above, protecting groups may remain without deprotecting some H. Protecting groups may also remain on some of the functional groups of the n segment.

[Chemical formula 10]
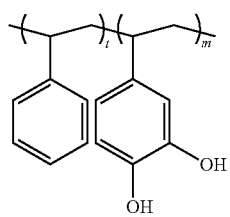
(6)
[Chemical formula 11]
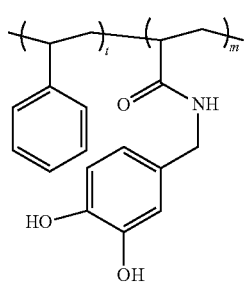
(7)
[Chemical formula 12]
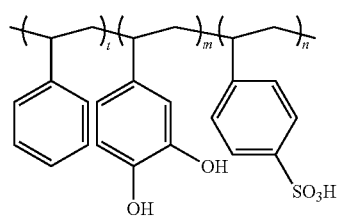
(8)
[Chemical formula 13]
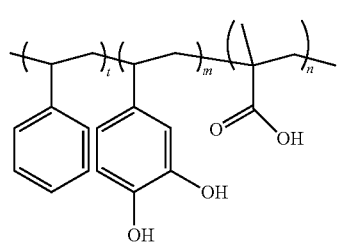
(9)
[Chemical formula 14]
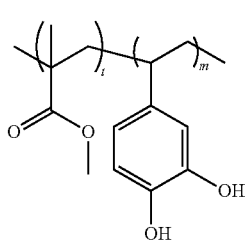
(10)
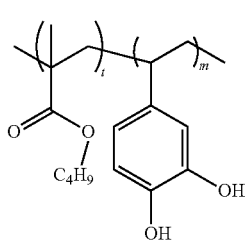
(11)
-continued
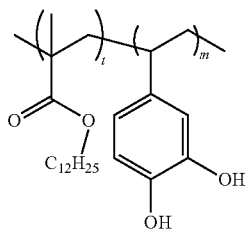
(12)
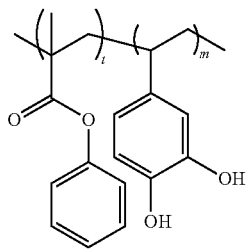
(13)
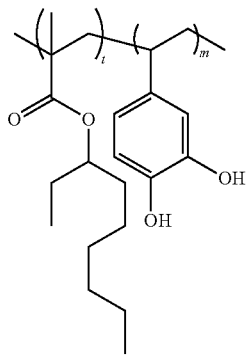
(14)
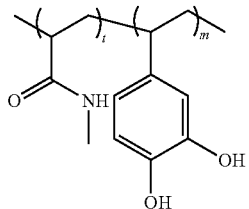
(15)
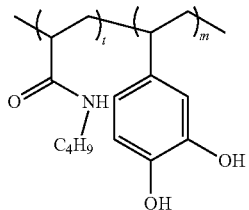
(16)
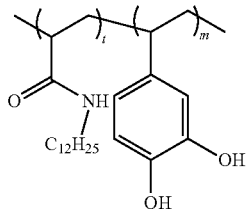
(17)

[Chemical formula 15]
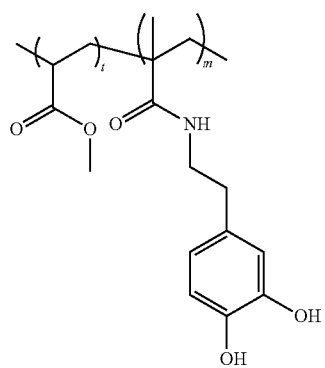
(18)
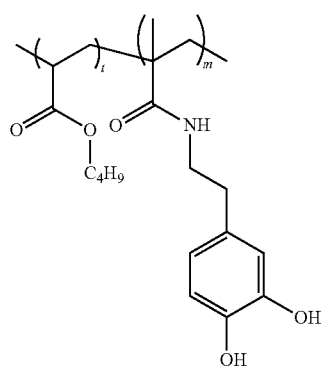
(19)
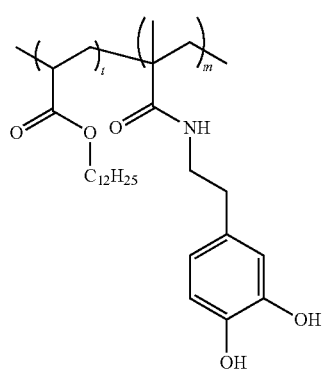
(20)
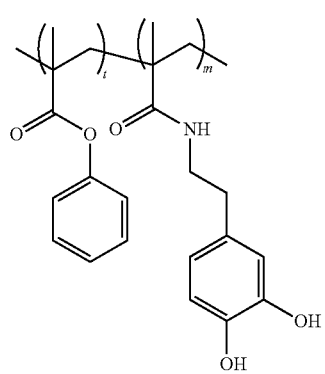
(21)
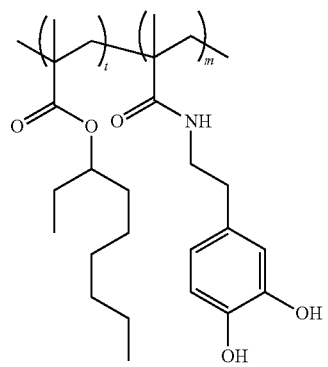
(22)
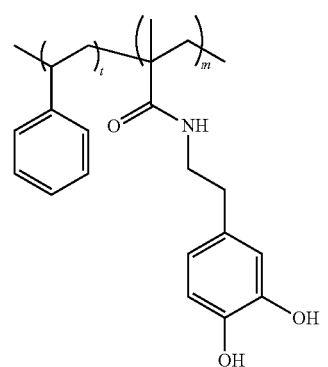
(23)
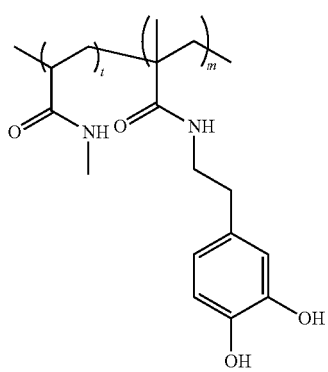
(24)
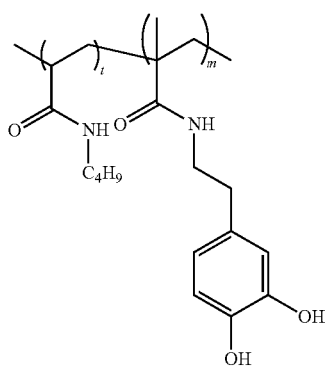
(25)

(26)
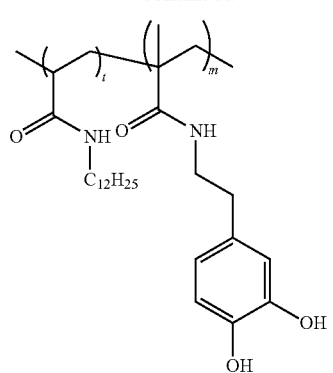
(27)
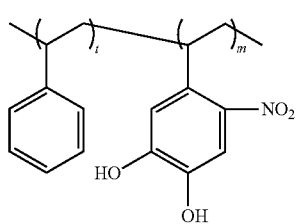
(28)
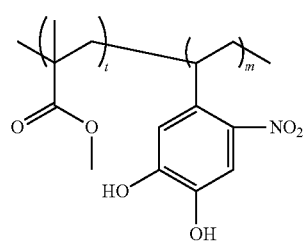
(29)
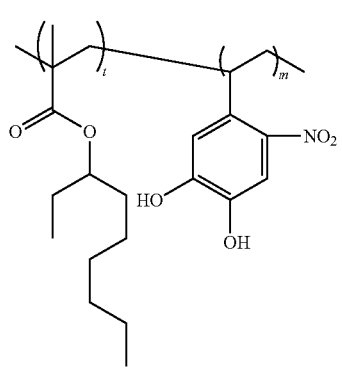
[Chemical formula 16]
(30)
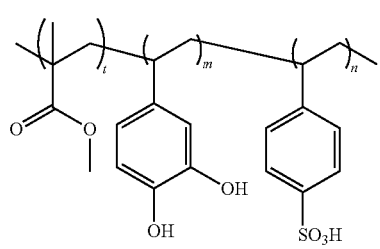
(31)
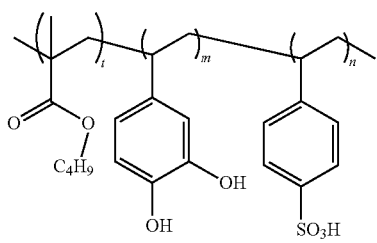
(32)
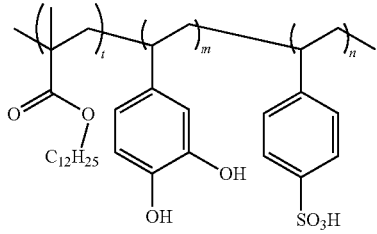
(33)
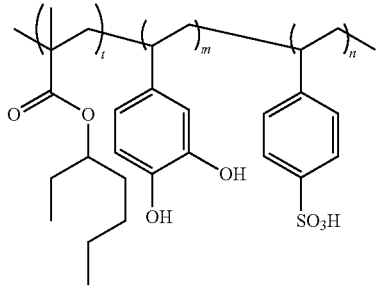
(34)
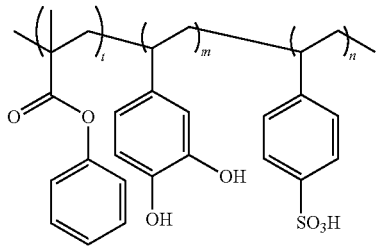
(35)
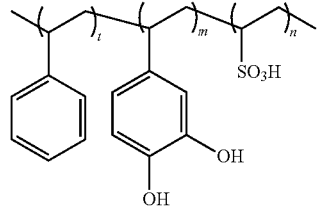
(36)
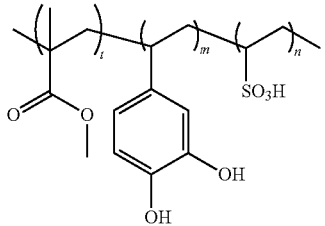

(37) 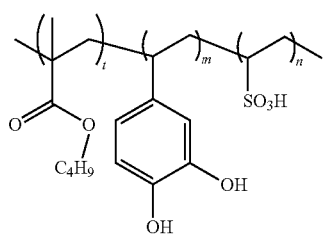

(38) 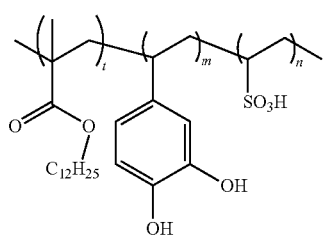

[Chemical formula 17]

(39) 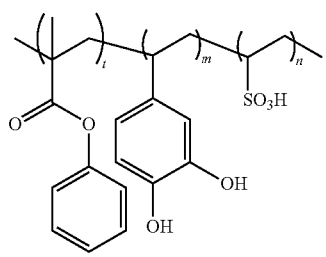

(40) 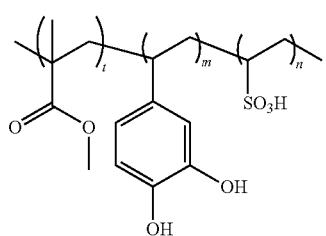

(41) 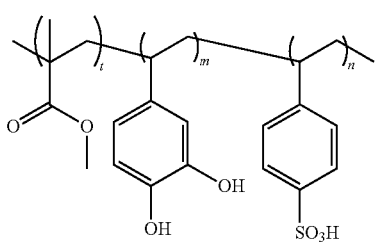

(42) 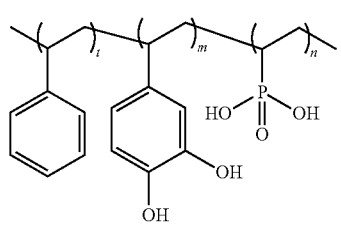

(43) 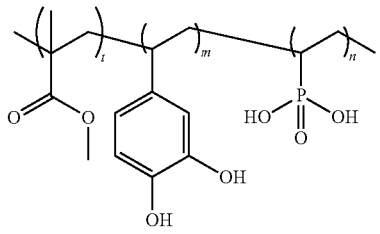

(44) 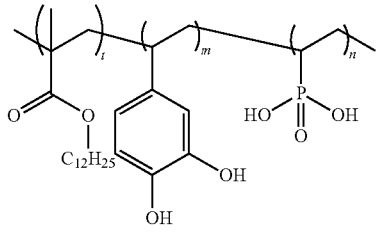

(45) 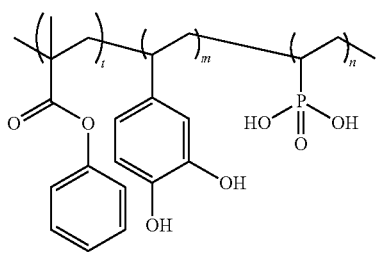

The method for producing a multilayered structure of the present invention includes the following steps.

(i) a step for dissolving the block copolymer produced in an organic solvent to produce a block copolymer solution, (j) a casting step for casting the block copolymer solution, (k) a multilayered structure production step for producing a multilayered structure in which the hydrophilic segments represented by m and n and the hydrophobic segments represented by t of the block copolymer are microlayer-separated by evaporating off the solvent of the cast block copolymer solution.

The organic solvent used in step (i) is not particularly restricted as long as the organic solvent can dissolve the block copolymer. Examples include aliphatic hydrocarbons such as hexane, heptane, cyclohexane and mineral terpenes; ethers such as diethyl ether, tetrahydrofuran, dioxane, diphenyl ether, anisole and dimethoxybenzene; amides such as N,N-dimethylformamide and N,N-dimethylacetamide; nitriles such as acetonitrile, propionitrile and benzonitrile; ester compounds or carbonate compounds such as acetone, methyl ethyl ketone, methyl isobutyl ketone, ethyl acetate, butyl acetate, ethylene carbonate and propylene carbonate; alcohols such as methanol, ethanol, propanol, isopropanol, n-butyl alcohol, t-butyl alcohol and isoamyl alcohol; aromatic hydrocarbons such as benzene and toluene; and halogenated hydrocarbons such as chlorobenzene, methylene chloride, chloroform, chlorobenzene and benzotrifluoride.

A mold capable of producing the desired multilayered structure shape may be used in the casting step (j), and, casting may be performed on a flat plate when producing a multilayered structure on a thin film. The film thickness can also be adjusted by varying the amount cast. A sacrificial layer dissolved using a solvent such as polyvinyl alcohol that does not dissolve the polymer is formed on a substrate, and a thin film may be formed thereon.

The solvent may be air dried at normal temperature and normal pressure or may be evaporated off by vacuum drying or the like in the multilayered structure production step (k).

The method for producing a multilayered structure including inorganic nanoparticles of the present invention includes the following steps.

(l) an immersion step for immersing the multilayered structure produced in the above (k) in a solution including an inorganic ion, (m) an inorganic nanoparticle production step for reducing the inorganic ion by the catechol groups of segments represented by m of the multilayered structure and producing inorganic nanoparticles in the microlayers including segments represented by m.

Furthermore, in the present invention, "inorganic nanoparticles" means particles that are formed by reducing the inorganic ion by electrons being donated from the hydroxy groups of the catechol. The particle size of the "inorganic nanoparticles" in the present invention varies according to the type of inorganic substance, but is from the size of an atom of each inorganic material to about 100 nm (when the length b of the catechol segment is 1000). Also, "inorganic salt" in the present invention means one capable of producing the above "inorganic nanoparticles" by forming an inorganic ion solution by being added to water, a polar organic solvent that does not dissolve the block copolymer, or an ionic liquid. Examples of polar organic solvents include dimethylsulfoxide (DMSO) and dimethylsulfoxide (DMF). Examples of ionic liquids include an imidazolium salt, pyridinium salt, and ammonium salt.

The inorganic nanoparticles of the present invention, as mentioned above, are not particularly limited as long as particles that are formed by reducing by electrons being donated from the hydroxy groups of the catechol. Examples can include metals such as gold (Au), silver (Ag), platinum (Pt), palladium (Pd), rhodium (Rh), iridium (Ir), ruthenium (Ru), osmium (Os) and copper (Cu); metal compounds such as CdS, CeSe, CeTe and ZnS; ferrimagnetic materials such as $Fe_2O_3$; alloys such as Ag/Au and Au/Pt; and the like.

Furthermore, in the present invention, the inorganic ion forms inorganic nanoparticles by reduction by electrons being donated from the hydroxy groups of the catechol. However, when an inorganic ion with a lower ionizing tendency is added thereafter, the inorganic nanoparticles are again ionized, and the inorganic ion of the lesser ionizing tendency is reduced to form inorganic nanoparticles. An "alloy" in the present invention means one in which metal particles of different ionizing tendencies are present in mixture in segments that include catechol groups of the block copolymer of the present invention by utilizing the above ionizing tendency. Oxides such as $Fe_2O_3$ may be oxidized by bubbling oxygen after the inorganic ion has been reduced. Sulfides such as CdS may be sulfurized by bubbling hydrogen sulfide gas after the inorganic ion has been reduced. Metal compounds such as CeTe may be reduced in a state in which each ion is jointly present. When the ionizing tendency is close, metal particles of different ionizing tendencies may be made to be present in mixture in segments including catechol groups by reduction in a state in which each ion is jointly present.

Inorganic salts for producing the above inorganic nanoparticles, as mentioned above, are not particularly restricted as long as the inorganic salt ionizes in water. Examples include gold(III) chloride ($AuCl_3$), tetrachloroauric(III) acid (chloroauric acid) ($HAuCl_4$), silver(I) nitrate ($AgNO_3$), hexachloridoplatinic(IV) acid H ($H_2[PtCl]$ ($H_2O)_6$), palladium chloride ($PdCl_2$), rhodium sulfate ($O_4Rh_2S$), potassium hexachloroiridate ($Cl_6IrK_2$), tetrapropylammonium perruthenate ($(C_3H_7)_4N^+RuO_4^-$), osmium tetroxide ($O_4Os$), copper sulfate ($CuSO_4$), cadmium chloride ($CdCl_2$), acid cerium(III) octahydrate ($Ce_2(SO_4)_3$ $8H_2O$), selenium tetrachloride ($SeCl_4$), tellurium sulfide (TeS), zinc sulfate ($ZnSO_4$), and iron chloride ($FeCl_2$).

The unreacted inorganic ion may be washed away by washing the multilayered structure with water as needed after the inorganic nanoparticle production step.

Furthermore, the catechol groups become quinone when the inorganic ion is reduced. The quinone is hydrophobic. Therefore, since the m segment of formula (1) becomes hydrophobic as the hydrophilic catechol groups change into hydrophobic quinone, it becomes difficult to reduce the inorganic ion dissolved in water. As a result, reduction of the inorganic ion ceases even through catechol groups are present in the m segment of formula (1) as reduction of a certain amount of inorganic ion advances regardless of the inorganic ion concentration. Catechol groups and quinone are therefore included in the hydrophilic segments of formula (1) of the "multilayered structure including inorganic nanoparticles" of the present invention.

Incidentally, catechol groups (dopa derivative) are known to have high adhesive capability (Japanese Translation of PCT International Application Publication No. 2013-503688). Also, as mentioned above, catechol groups remain in the "multilayered structure including inorganic nanoparticles" of the present invention. Therefore, when the "multilayered structure including inorganic nanoparticles" is used as a solid polymer membrane for a separator of a fuel cell, the movement of the inorganic nanoparticles can be suppressed in the microlayers having the hydrophilic segments by the adhesive strength of the residual catechol groups even though a current flows between the anode electrode and cathode electrode.

The multilayered structure including inorganic nanoparticles can be used as a solid polymer membrane for a separator of a fuel cell by itself, but a protective film or the like may be affixed as needed.

Also, when producing a fuel cell, the solid polymer membrane may be interposed between a known anode electrode and cathode electrode.

Examples appear below, and the present invention is explained specifically. However, these examples are merely provided as references for specific embodiments to explain the present invention. These illustrations are intended to explain specific embodiments of the present invention, but do not limit or represent limitations to the scope of the invention disclosed in this application.

EXAMPLES

Example 1

[Synthesis of a Block Copolymer Including a Catechol Segment Protected by a Protecting Group]

A block copolymer was synthesized by the procedure described below.

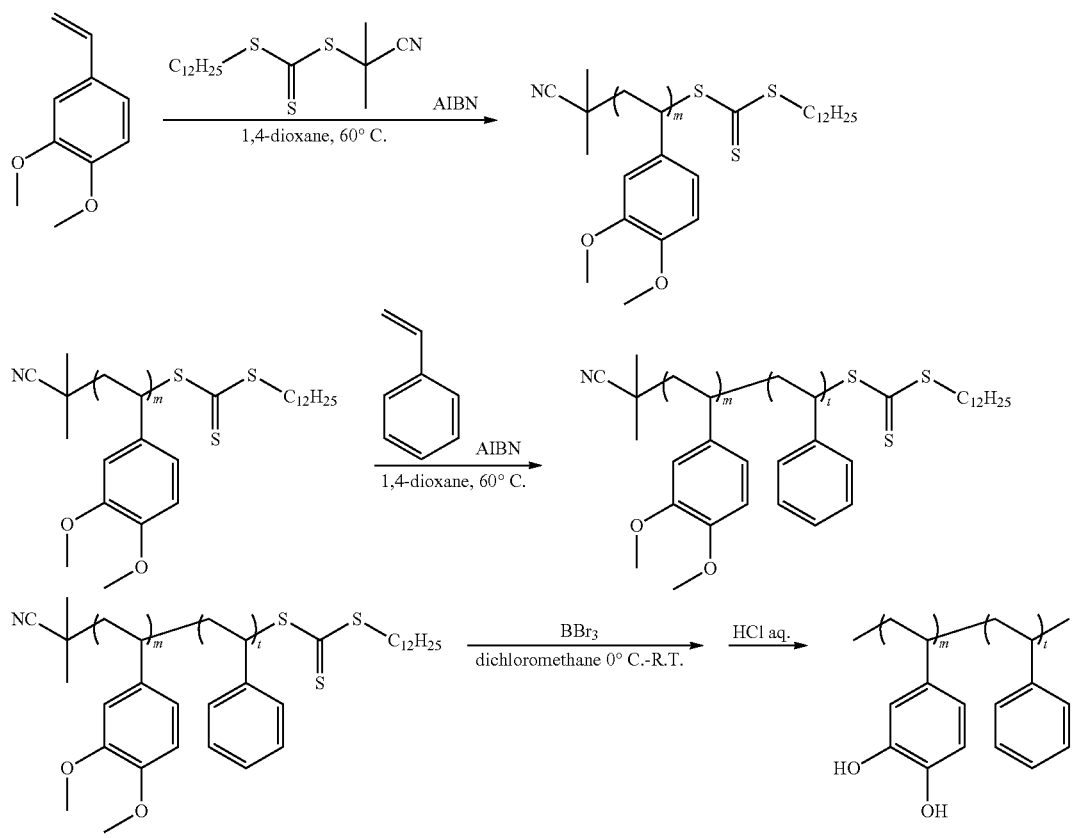

300 mg of dimethoxystyrene (DMSt; 154466 manufactured by Aldrich),
6.3 mg of 2-cyano-2-propyldodecyltrithiocarbonate (723037 manufactured by Aldrich),
1.0 mg of azobisisobutyronitrile (AIBN; 019-04932 manufactured by Wako Pure Chemical Industries, Ltd.), and
500 mg of 1,4-dioxane (042-03766 manufactured by Wako Pure Chemical Industries, Ltd.)
were placed in a test tube. After being frozen using liquid nitrogen and suctioned by pump, the solution was dissolved and the interior of the test tube was purged by nitrogen. After repeating this procedure twice, a reaction was carried out for 60 minutes at 60° C. After the reaction, the solution was added dropwise to hexane and centrifuged for ten minutes at 1500 rpm in a centrifuge. The monomer was removed, and the solution was vacuum dried. After drying, the molecular weight of the polymer was measured by GPC. The GPC measurement results showed a weight average molecular weight (Mw) of the polymer of 19,800.

Next,
110 mg of dried polymer,
1000 mg of styrene (St; 191-08206 manufactured by Wako Pure Chemical Industries, Ltd.),
1.6 mg of azobisisobutyronitrile, and
500 mg of 1,4-dioxane
were placed in a test tube. After being frozen using liquid nitrogen and suctioned by pump, the solution was dissolved and the interior of the test tube was purged by nitrogen. After repeating this procedure twice, a reaction was carried out for 61 hours at 60° C. After the reaction, the solution was added dropwise to hexane and centrifuged for ten minutes at 1500 rpm in a centrifuge. The monomer was removed, and the solution was vacuum dried. After drying, the molecular weight of the polymer was measured by GPC, and the chemical structure of the block copolymer was determined by NMR.

The GPC results showed a weight average molecular weight (Mw) of the block copolymer synthesized of 57,900. The polymerization ratio was St:DMSt=3.1:1. FIG. 1 shows the NMR measurement results of the block copolymer synthesized in Example 1. Furthermore, "molecular weight of the block copolymer" in the present invention means the weight average molecular weight when measured in terms of polystyrene using an HLC-8320 GPC manufactured by Tosoh. The trichloromethane in FIG. 1 was hydrogen-exchanged trichloromethane included in the heavy solvent; the acetone was thought to remain from washing the NMR tube.

[Synthesis of a Diblock Copolymer Including a Catechol Segment]

100 mg of the dried block copolymer obtained by the above procedure was dissolved in 5 mL of dichloromethane (135-02446 manufactured by Wako Pure Chemical Industries, Ltd.). After nitrogen bubbling, 0.3 mL of a 75.7 g/L boron tribromide (202207 manufactured by Aldrich) solution was introduced and stirred overnight at room temperature. A quantity of 2.5 mL of water was introduced into this solution, followed by centrifugation of 5 mL of 2 M sodium chloride aqueous solution for 15 minutes at 10,000 rpm at 5° C. Centrifugation was performed thereafter for 15 minutes at 10,000 rpm at 5° C. using 5 mL of methanol. A block copolymer including a catechol segment was synthesized by drying the block copolymer obtained under vacuum conditions.

Example 2

[Synthesis of a Triblock Copolymer]

A triblock copolymer was synthesized by the procedure described below.

(1) Synthesis of PMMA RAFT 2 g of methyl methacrylate (MMA, 139-02726 manufactured by Wako Pure Chemical Industries, Ltd.), 41.6 mg of 2-cyano-2-propyldodecyltrithiocarbonate (RAFT agent, CPDTTC, manufactured by Sigma-Aldrich), and 10.8 mg of 2,2-azobisisobutyronitrile (AIBN, 019-04932 manufactured by Wako Pure Chemical Industries, Ltd.)

Figure 2:
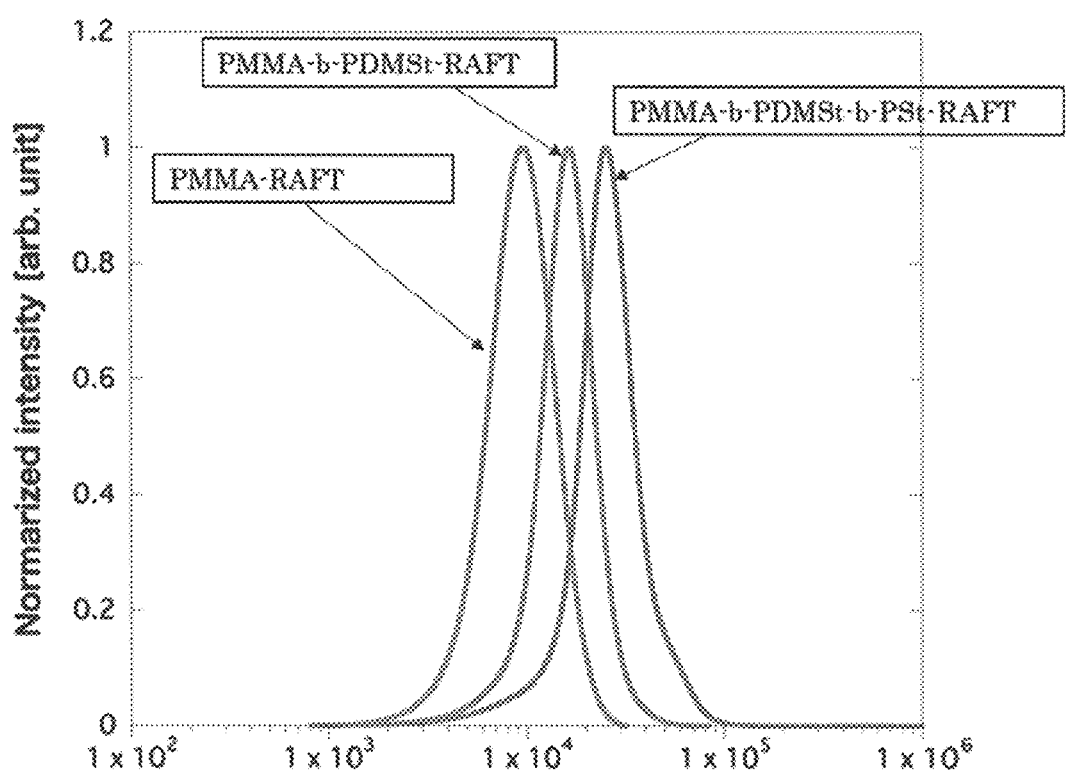
FIG. 2 shows the GPC chart of a triblock copolymer synthesized in Example 2.

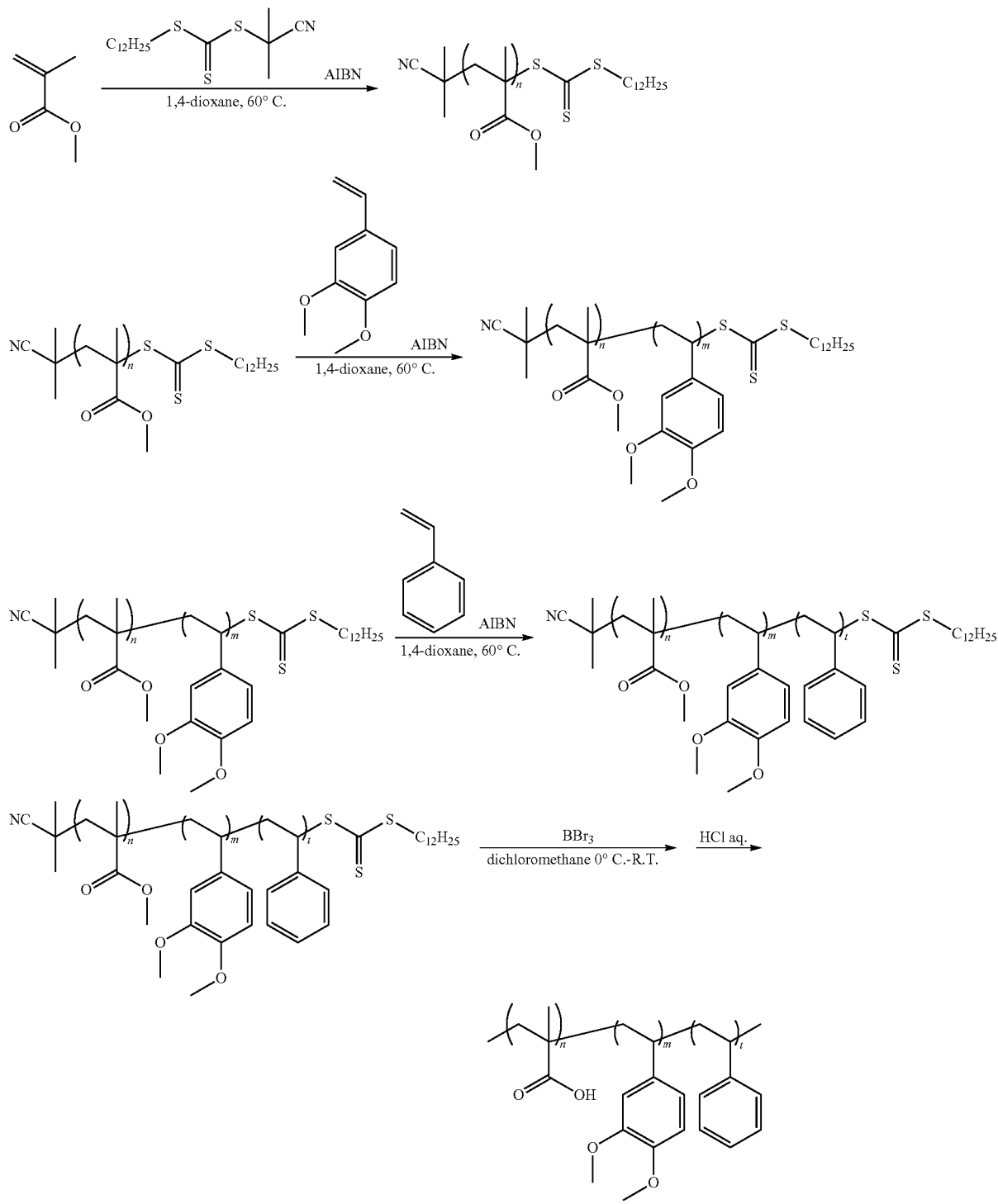

were dissolved in 1 g of 1,4-dioxane (042-03766 manufactured by Wako Pure Chemical Industries, Ltd.) and sealed in a glass tube. The inside of the tube was deoxygenated by freezing and degassing three times and finally purged by nitrogen. Polymerization was carried out for six hours at 60° C. using an aluminum block heater. The solution obtained was reprecipitated in a large excess of methanol, and the solid obtained was dried under reduced pressure. The number average molecular weight (Mn), weight average molecular weight (Mw), and polydispersity (PDI) of the polymer (PMMA-RAFT) obtained were Mn=11.5 k, Mw=12.9 k, and PDI=1.12 by gel permeation chromatography (GPC). The GPC chart is shown in FIG. 2.

(2) Synthesis of PMMA-b-PDMSt-RAFT 632.5 mg of PMMA-RAFT, 2 g of 1,4-dimethoxystyrene (DMSt, manufactured by Wako Pure Chemical Industries, Ltd.), and 6.9 mg of AIBN were dissolved in 1 g of 1,4-dioxane and sealed in a glass tube. The inside of the tube was deoxygenated by freezing and degassing three times and finally purged by nitrogen. Polymerization was carried out for six hours at 60° C. using an aluminum block heater. The solution obtained was reprecipitated in a large excess of methanol, and the solid obtained was dried under reduced pressure. The number average molecular weight (Mn), weight average molecular weight (Mw), and polydispersity (PDI) of the polymer (PMMA-b-PDMSt-RAFT) obtained were Mn=17.2 k, Mw=19.4 k, and PDI=1.13 by gel permeation chromatography (GPC). The GPC chart is shown in FIG. 2.

(3) Synthesis of PMMA-b-PDMSt-b-PSt-RAFT 856.4 mg of PMMA-b-PDMSt-RAFT, 2.06 g of styrene (St, manufactured by Wako Pure Chemical Industries, Ltd.), and 5.2 mg of AIBN were dissolved in 1 g of 1,4-dioxane and sealed in a glass tube. The inside of the tube was deoxygenated by freezing and degassing three times and finally purged by nitrogen. Polymerization was carried out for six hours at 60° C. using an aluminum block heater. The solution obtained was reprecipitated in a large excess of methanol, and the solid obtained was dried under reduced pressure. The number average molecular weight (Mn), weight average molecular weight (Mw), and polydispersity (PDI) of the polymer (PMMA-b-PDMSt-b-PSt-RAFT) obtained were Mn=27.0 k, Mw=30.6 k, and PDI=1.14 by gel permeation chromatography (GPC). The GPC chart is shown in FIG. 2.

Figure 3:
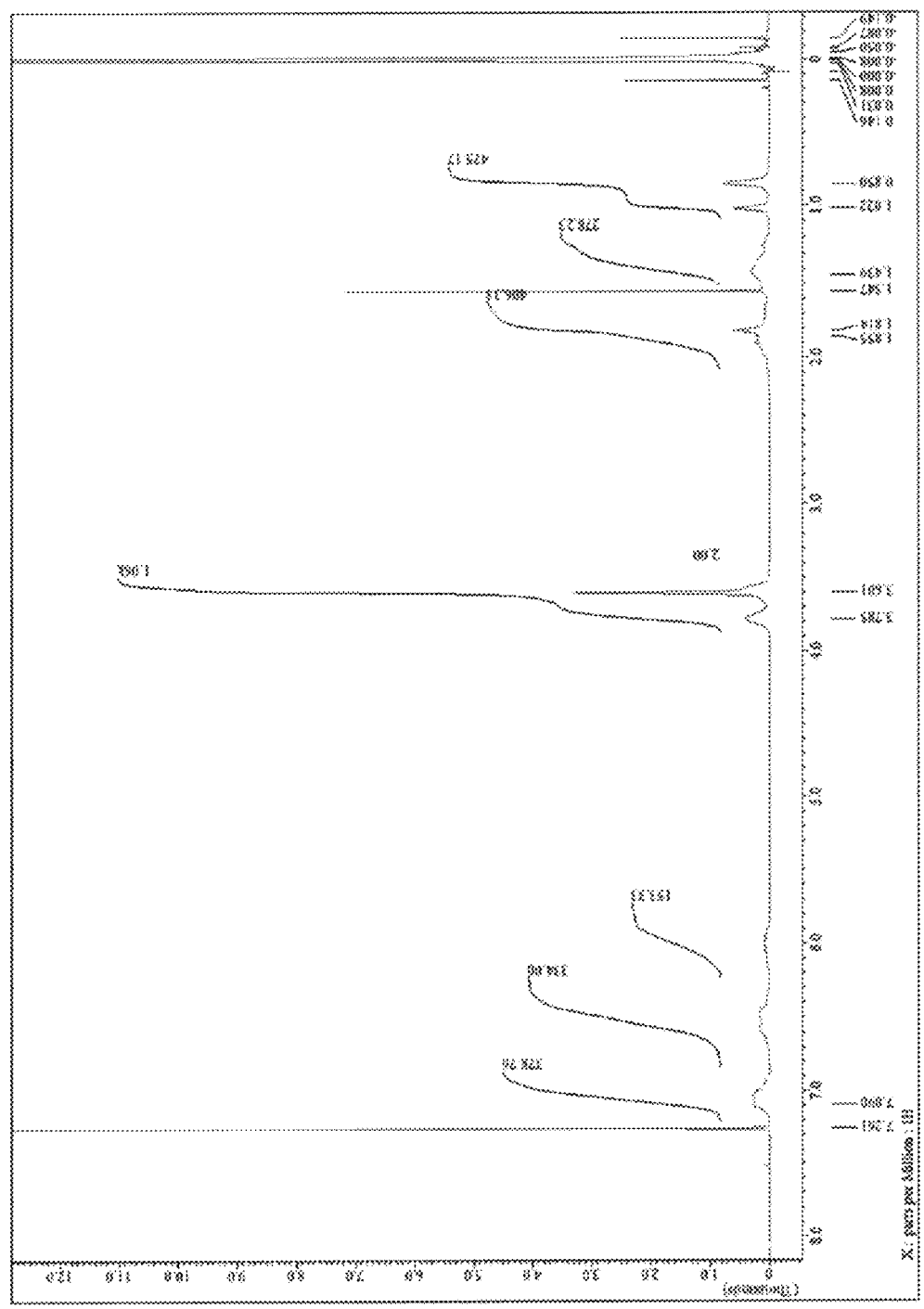
FIG. 3 shows the NMR measurement results before deprotection of a triblock copolymer synthesized in Example 2.
Figure 4:
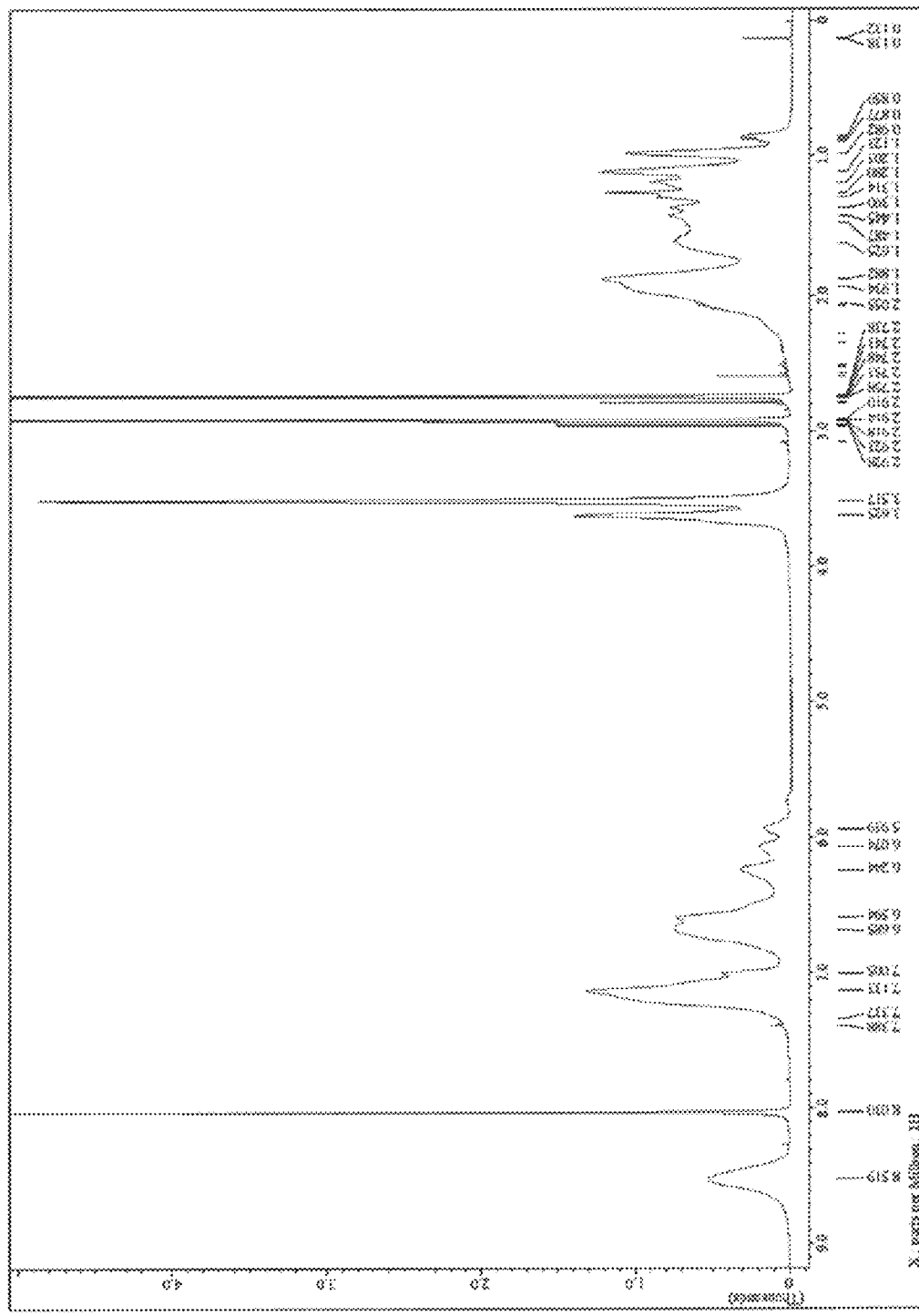
FIG. 4 shows the NMR measurement results after deprotection of a triblock copolymer synthesized in Example 2.

(4) Deprotection 150 mg of PMMA-b-PDMSt-b-PSt-RAFT was dissolved in 5 mL of dichloromethane (manufactured by Wako Pure Chemical Industries, Ltd.). After sealing a glass vial using a rubber septum, 0.5 mL of boron tribromide (202207 manufactured by Aldrich) was slowly injected in a state cooled to 0° C. After reacting for 12 hours, an excess of 1N hydrochloric acid aqueous solution was admixed, and deprotection was performed. After stirring for three hours, the white precipitate was dried under reduced pressure. Deprotection was confirmed to be complete and synthesis of PMMA-b-PVCa-b-PSt was confirmed to have been possible based on the disappearance of the $\delta=3.785$ peak from the methoxy group proton by $^1$H-NMR before (FIG. 3) and after (FIG. 4) reaction. Furthermore, judging from the integral ratio in NMR, some of the methoxy groups of the PMMA were deprotected to carboxylic acid.

Example 3

[Production of a Multilayered Structure]

Figure 5:
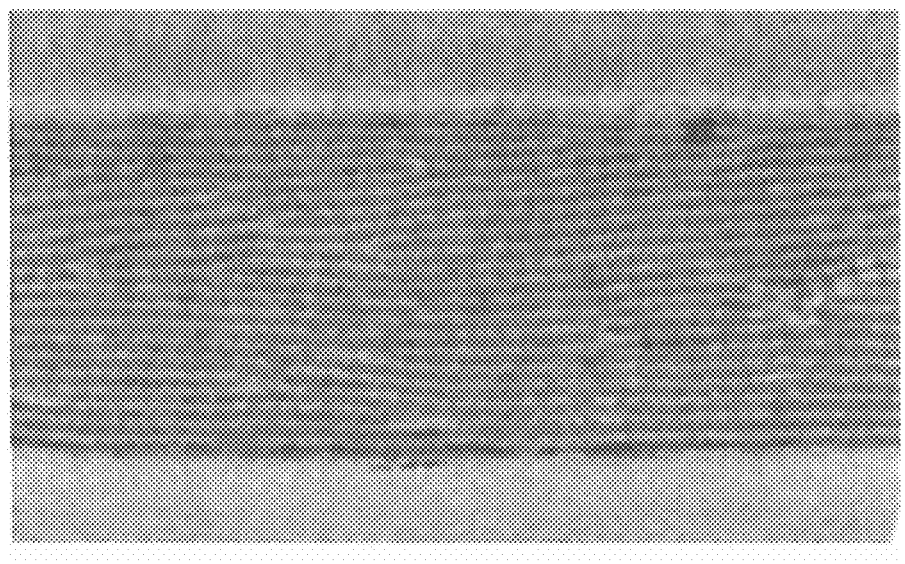
FIG. 5 is a photograph substituted for a drawing and shows a TEM photograph of a multilayered structure produced in Example 3.

A block copolymer solution was produced by dissolving the block copolymer synthesized in Example 1 in tetrahydrofuran (THF). Next, the block copolymer solution was cast on a silicon substrate or a silicon substrate that had been spin coated with a PVA sacrificial layer, and a multilayered structure was produced by evaporating off the solvent from the cast block copolymer solution. Next, the multilayered structure produced was stained by osmium tetroxide. FIG. 5 is a TEM photograph of the multilayered structure produced in Example 3. It was confirmed that a multilayered structure can be produced from the block copolymer of the present invention.

Example 4

[Production of a Multilayered Structure Including Inorganic (Ag) Nanoparticles]

Figure 6:
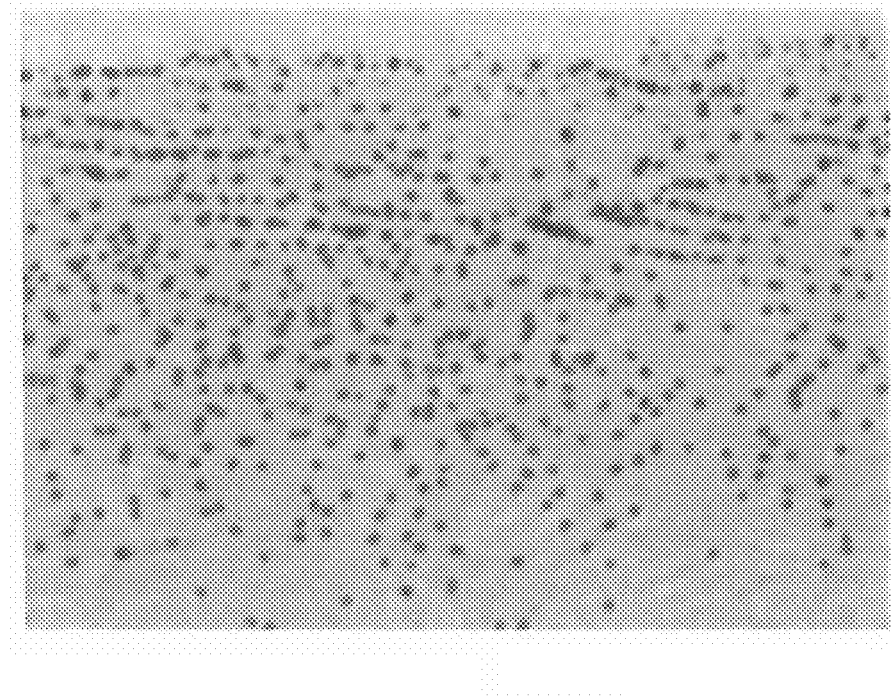
FIG. 6 is a photograph substituted for a drawing and shows a TEM photograph of a multilayered structure including inorganic nanoparticles produced in Example 4.

A multilayered structure including inorganic (Ag) nanoparticles was produced by immersing the multilayered structure produced in Example 3 for 30 minutes in a 200 mg/L AgNO$_3$ aqueous solution, then washing with pure water. FIG. 6 is a TEM photograph of the multilayered structure including inorganic nanoparticles produced in Example 4. The black dots in the photograph are Ag nanoparticles. As is evident from the photograph, Ag nanoparticles were confirmed to be produced along the microlayers of the multilayered structure.

Figure 7:
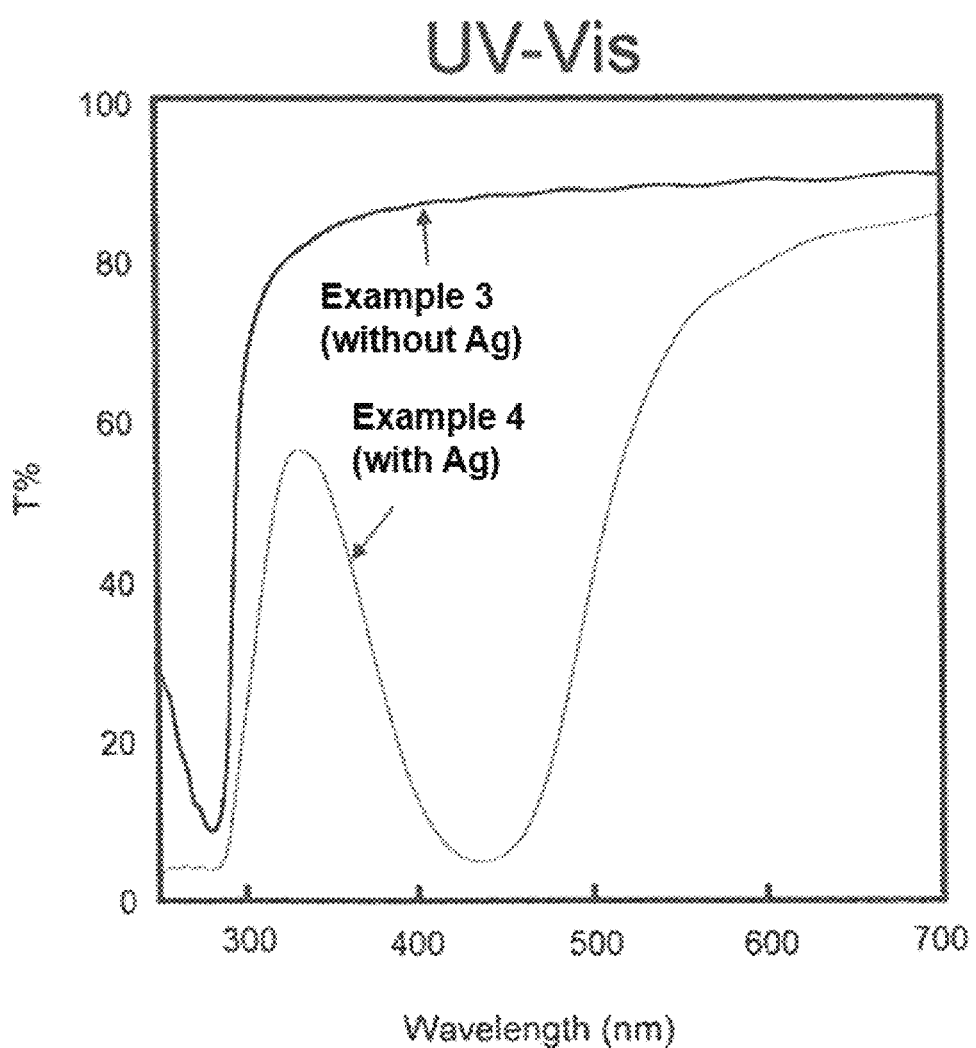
FIG. 7 is a graph representing the results of measurement of the absorption wavelength of multilayered structures produced in Example 3 (without Ag nanoparticles) and Example 4 (with Ag nanoparticles) using UV-Vis.

FIG. 7 is a graph representing the results of measurement (V-670 manufactured by JASCO Corporation) of the absorption wavelength of the multilayered structures produced in Example 3 (without Ag nanoparticles) and Example 4 (with Ag nanoparticles) using UV-Vis. The multilayered structure produced in Example 4 presented an orange color and had an absorption maximum at 416 nm according to the UV-Vis measurement results. This wavelength concurred with the absorption wavelength of the Ag nanoparticles.

Figure 8:
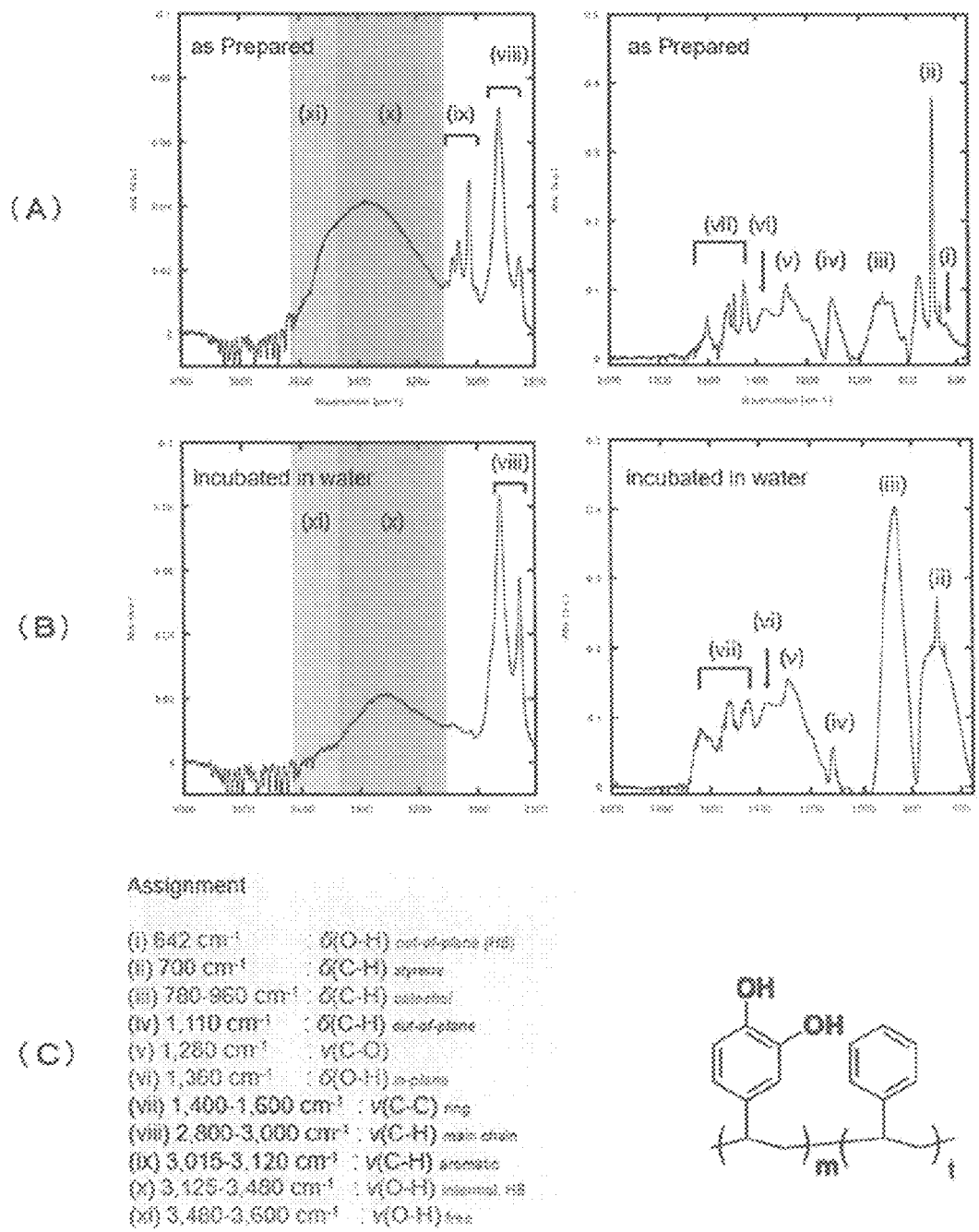
FIG. 8 shows the results of measurement of a multilayered structure including Ag nanoparticles produced in Example 4 using an infrared spectrometer.

FIG. 8 shows the results of measurement of a multilayered structure including the Ag nanoparticles produced in Example 4 using an infrared spectrometer (FT/IR 6700 manufactured by JASCO Corporation). FIG. 8(A) represents the infrared absorption spectrum of a multilayered structure including Ag nanoparticles in a dry state; FIG. 8(B) represents the infrared spectrum of a multilayered structure including Ag nanoparticles in a moist state; and FIG. 8(C) represents the wavelengths attributable to each molecule. As shown in FIGS. 8(A) and (B), it was confirmed that all peaks were cleanly attributed. Also, benzene ring peaks <<(ii) and (iX)>> were clearly observed in the dry state. On the other hand, the peak (iii) derived from the catechol C—H bending increased and the 1-substituted benzene <<(ii) and (iX)>> peaks decreased in the moist state. This shows that the catechol layer is swollen by the introduction of water. In addition, judging from the OH vibration, there were more free OH groups in the dry state (Xi), but most OH were hydrogen bonded in the moist state (X).

The above results confirmed that by immersing a multilayered structure produced from a block copolymer in a solution containing Ag ion the catechol groups reduce the Ag ion to form Ag nanoparticles in the microlayers of the hydrophilic segments having catechol groups. Also, since the peak (iii) derived from C—H bending of the catechol increased in a moist state, catechol groups were confirmed to be contained in hydrophilic segments after formation of Ag nanoparticles. In addition, since the catechol groups of the hydrophilic segments hydrogen bonded upon introduction of water, it can be inferred that the multilayered structure of the present invention has improved proton conductivity when placed in a moist state.

Example 5

[Confirmation of Proton Conductivity of the Multilayered Structure]

Figure 9:
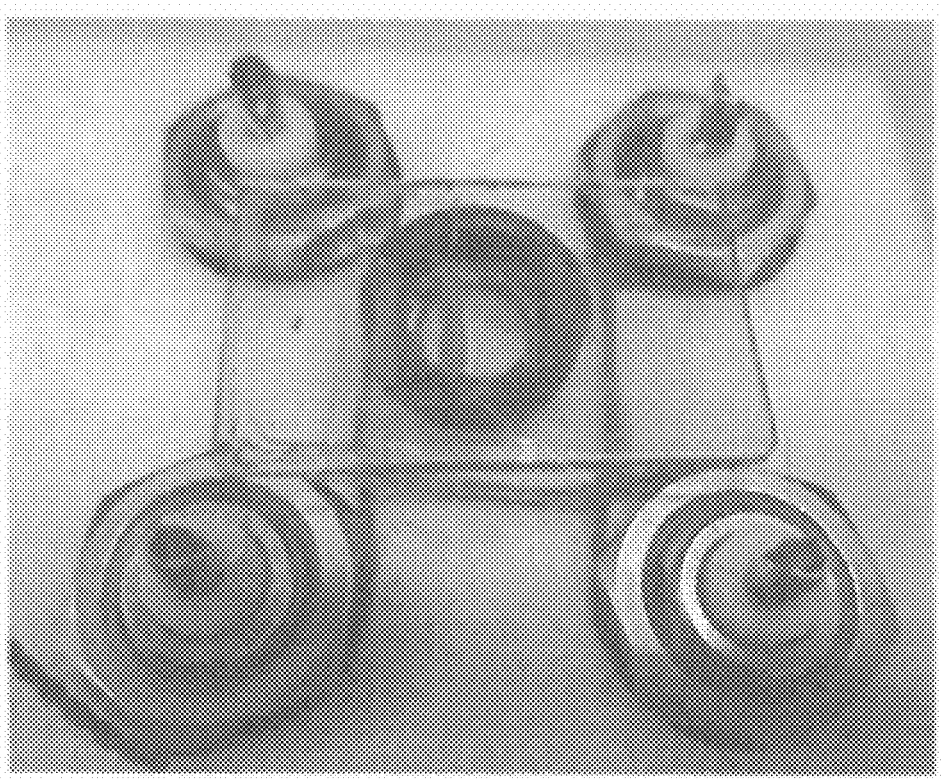
FIG. 9 is a photograph substituted for a drawing and is a photograph of an experimental device used in Example 5.
Figure 10:
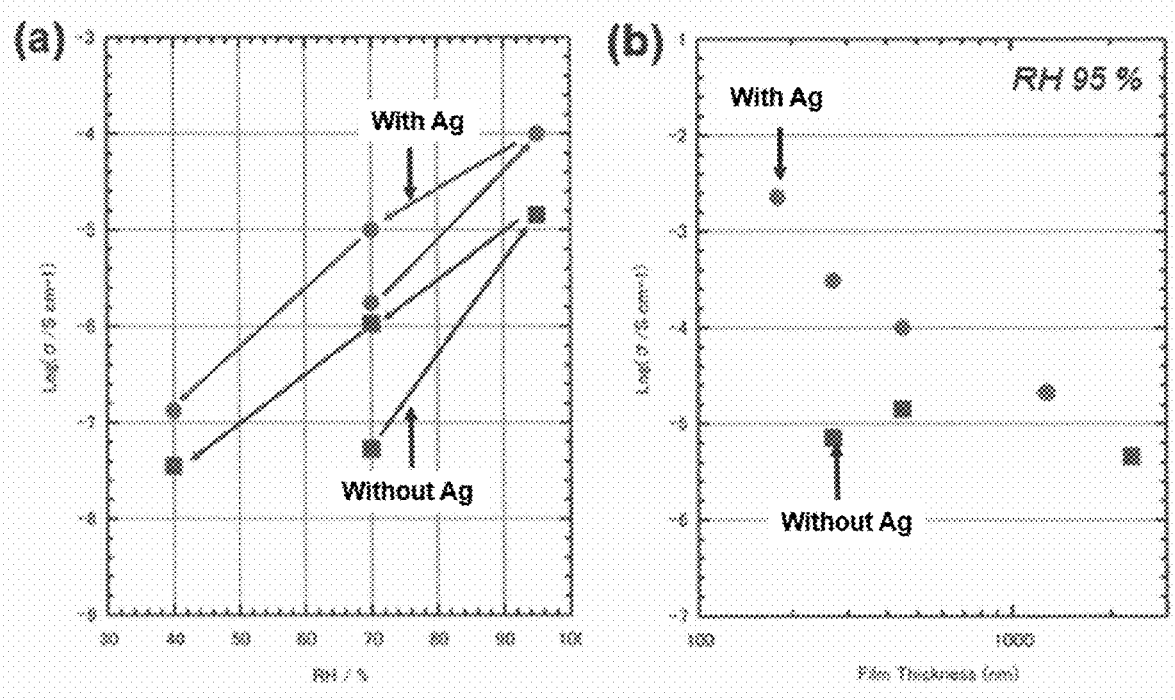
FIG. 10(a) is a graph representing the relationship between the humidity and proton conductivity when using a 500 nm thick multilayered structure in Example 5.
FIG. 10(b) is a graph representing the relationship between the multilayered structure thickness and proton conductivity.

Since the multilayered structure of the present invention was inferred to have improved proton conductivity when placed in a moist state as mentioned above, tests were conducted to confirm the proton conductivity of the multilayered structures produced in Examples 3 and 4. Furthermore, multilayered structures having different thicknesses were prepared by varying the amount of block copolymer solution during casting for the tests. Testing was conducted by measurement using an impedance measurement device (SI1260, Solatron Analytical) in a humidity adjustment chamber (SH-221, Espec Corp.). Two gold paste electrodes were applied in parallel, and a gold wire was used in the electrode. FIG. 9 is a photograph of the experimental device used in Example 5; FIG. 10(a) is a graph representing the relationship between the humidity and proton conductivity when using a 500 nm thick multilayered structure; FIG. 10(b) is a graph representing the relationship between the multilayered structure thickness and proton conductivity.

As shown in FIG. 10(a), the proton transport capacity of both multilayered structures produced in Example 3 (without Ag nanoparticles) and Example 4 (with Ag nanoparticles) was confirmed to be improved by absorption of water. It was also confirmed that the proton conductivity of the multilayered structure including Ag nanoparticles of Example 4 was increased about one order of magnitude over that of the multilayered structure of Example 3 which did not include Ag nanoparticles. As shown in FIG. 10(b), the multilayered structure including Ag nanoparticles of Example 4 was confirmed to have improved proton conductivity as the structure became thinner. When the multilayered structure including Ag nanoparticles was thinner than about 500 nm, the proton conductivity was improved over that when one without Ag nanoparticles were included. On the other hand, the film thickness of a single layer of a microlayer-separated separation layer is about 20 nm. Therefore, a thickness of about 20 to 500 nm is preferred as a multilayered structure when Ag nanoparticles are included.

[Observation of Ag Nanoparticles Before and after Proton Conductivity Testing]

Figure 11:
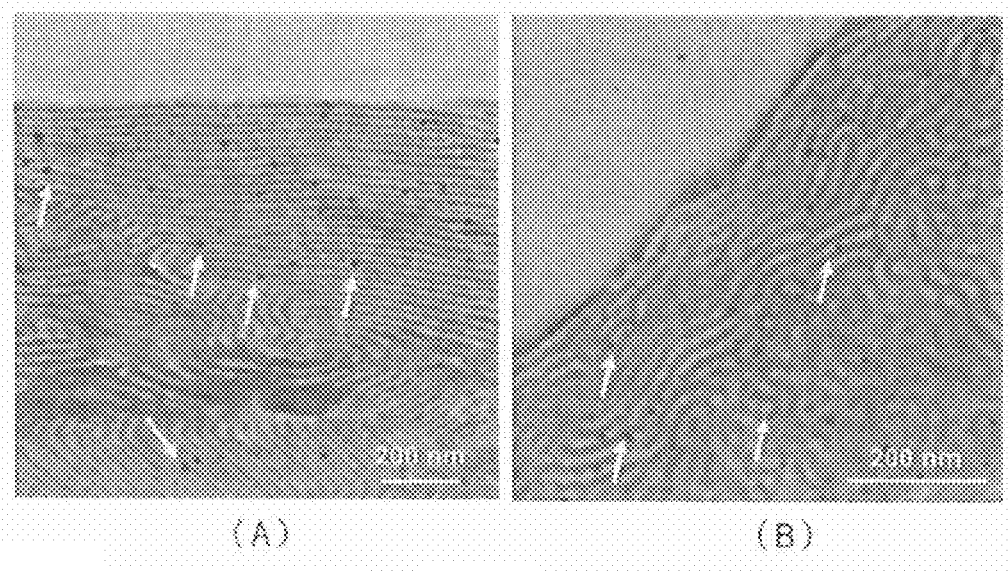
FIG. 11 is a photograph substituted for a drawing.

FIG. 11(A) is a TEM photograph of a multilayered structure including Ag nanoparticles before supplying current to the electrodes in Example 5; FIG. 11(B) is a TEM photograph of a multilayered structure including Ag nanoparticles after supplying current. The black dots (tip of the arrow) in the photographs are Ag nanoparticles. As is evident from FIGS. 11(A) and (B), the Ag nanoparticles were confirmed to remain in a state dispersed in the layers of the hydrophilic segments of the multilayered structure even after current passage in multilayered structures including Ag nanoparticles of the present invention.

The above results clarified that while both the multilayered structures produced in Example 3 (without Ag nanoparticles) and Example 4 (with Ag nanoparticles) demonstrate proton conductivity, the multilayered structure including Ag nanoparticles has superior proton conductivity and the proton conductivity increases as the film thickness of the multilayered structure decreases. Also, it was clarified that the multilayered structures of the present invention can be used as a solid polymer membrane for a separator of a fuel cell because the multilayered structures exhibit proton conductivity.

Example 6

[Production of Multilayered Structure Including Inorganic Nanoparticles Using a Triblock Copolymer and Confirmation of Proton Conductivity]

Figure 12:
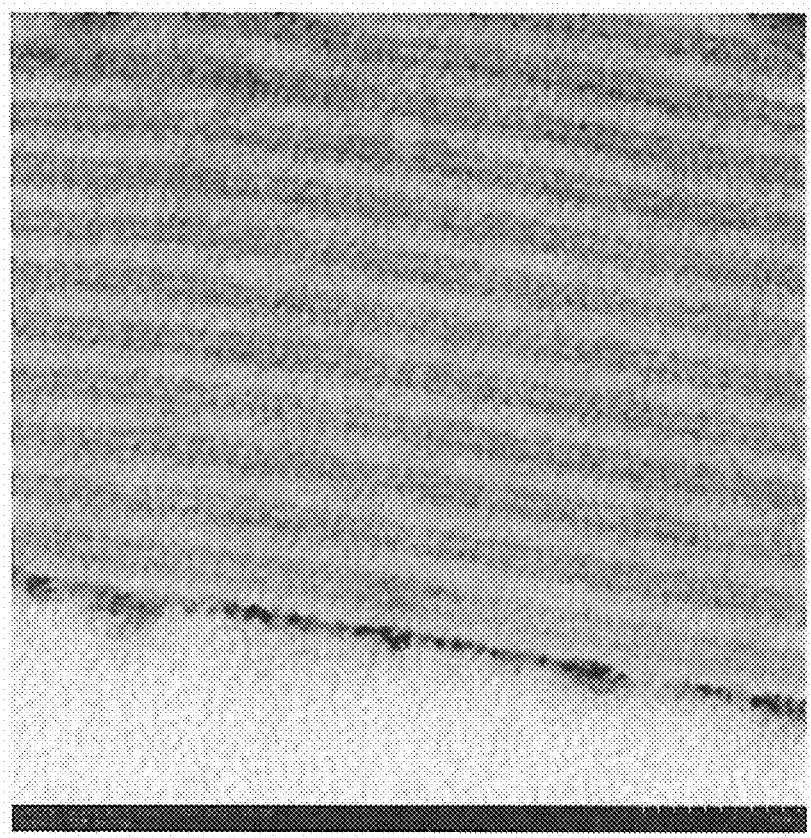
FIG. 12 is a photograph substituted for a drawing and is a TEM photograph of a sample after a film produced by spin coating was immersed in silver nitrate aqueous solution in Example 6.

A 10 wt % THF solution of the triblock copolymer (PMMA-b-PVCa-b-PSt) produced in Example 2 was prepared and cast coated or spin coated at 2000 rpm on a 20×10 mm quartz substrate, and a film was produced. Ag nanoparticles were then formed in the film by immersion in 200 mM silver nitrate aqueous solution. Part of the film obtained was stained by osmium tetroxide and embedded in epoxy resin. Ultrathin slices were then produced by ultramicrotome. Under examination by transmission electron microscope, the thickness of the film produced by cast coating was 1.4 μm and the thickness of the film produced by spin coating was about 70 nm. A structure of laminated cylinders was also observed in the interior. FIG. 12 is a TEM photograph taken after the film produced by spin coating was immersed in silver nitrate aqueous solution. As is evident from the photograph, Ag nanoparticles were confirmed to be formed along the microlayers of the multilayered structure even when a triblock copolymer was used, in the same way as with a diblock copolymer.

Next, the proton conductivity was evaluated by the same procedure as in Example 5 (humidity: 95%) using the film produced by spin coating in which Ag nanoparticles had been formed. The log a (S/cm) value was −4.9, and the film was confirmed to have proton conductivity.

INDUSTRIAL APPLICABILITY

The block copolymer of the present invention can produce a multilayered structure, and the multilayered structure is proton-conductive. Therefore, the multilayered structure can be used as a solid polymer membrane for a separator of a fuel cell, and a fuel cell can also be produced using the solid polymer membrane. The present invention is therefore useful for the fuel cell industry.

What is claimed is:

1. A block copolymer represented by formula (1) below,

[Chemical formula 1]

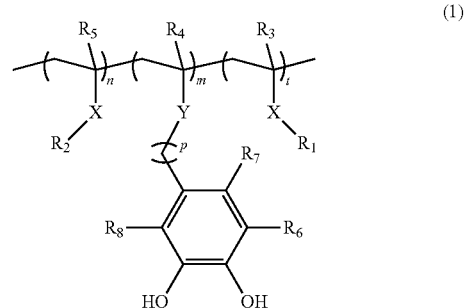

wherein in the formula, $R_1$ represents a C1-20 linear, branched, or cyclic alkyl group, C6-20 aryl group, or C7-20 aralkyl group; $R_2$ represents a group having a functional group having an acid dissociation constant pKa of from 0.5 to 7; $R_3$, $R_4$, and $R_5$ each show H or a C1-20 linear, branched, or cyclic alkyl group; $R_6$, $R_7$, and $R_8$ each represent a hydrogen, hydroxyl group, nitro group, carboxy group, or carbonyl group; X represents an amide or ester, but may not be included; Y represents an amide or ester, but may not be included; p represents an integer of 1-10, but may not be included; n represents an integer of 3-1000; m represents an integer of 3-1000; and t represents an integer of 3-1000; the arrangement of n, m, and t is arbitrary, but n and m are adjacent.

2. The block copolymer according to claim 1, wherein m, n, and t are such that m+n/m+n+t=0.2-0.8.

3. The block copolymer according to claim 1, wherein the acid dissociation constant pKa is from 0.5 to 4.

4. A multilayered structure wherein the hydrophilic segments represented by m and n and the hydrophobic segment represented by t of the block copolymer according to claim 1 have a microlayer-separated layer structure.

5. The multilayered structure according to claim 4, wherein a thickness of the multilayered structure is from 20 nm to 500 nm.

6. The multilayered structure according to claim 4, wherein the microlayers having hydrophilic segments include inorganic nanoparticles.

7. The multilayered structure according to claim 6, wherein the hydrophilic segments include a catechol group and quinone.

8. A solid polymer membrane for a separator of a fuel cell including the multilayered structure according to claim 6.

9. A fuel cell including the solid polymer membrane according to claim 8, an anode electrode, and a cathode electrode.

10. A method for producing a multilayered structure including
a step that dissolves a block copolymer represented by formula (1) below in an organic solvent to prepare a block copolymer solution,
a casting step that casts the block copolymer solution,
a multilayered structure production step that produces the multilayered structure in which hydrophilic segments represented by m and n and hydrophobic segment represented by t of the block copolymer are microlayer-separated by evaporating off the solvent of the cast block copolymer solution,

[Chemical formula 2]

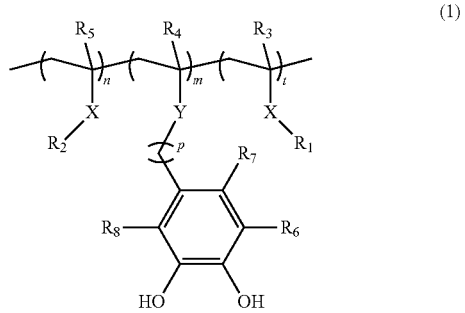

(1)

wherein in the formula, $R_1$ represents a C1-20 linear, branched, or cyclic alkyl group, C6-20 aryl group, or C7-20 aralkyl group; $R_2$ represents a group having a functional group having an acid dissociation constant pKa of from 0.5 to 7; $R_3$, $R_4$, and $R_5$ each show H or a C1-20 linear, branched, or cyclic alkyl group; $R_6$, $R_7$, and $R_8$ each represent a hydrogen, hydroxyl group, nitro group, carboxy group, or carbonyl group; X represents an amide or ester, but may not be included; Y represents an amide or ester, but may not be included; p represents an integer of 1-10, but may not be included; n represents an integer of 3-1000; m represents an integer of 3-1000; and t represents an integer of 3-1000; the arrangement of n, m, and t is arbitrary, but n and m are adjacent.

11. The method for producing the multilayered structure according to claim 10, wherein the acid dissociation constant pKa is from 0.5 to 4.

12. A method for producing a multilayered structure including inorganic nanoparticles that includes
an immersion step for immersing a multilayered structure produced by the production method according to claim 10 in a solution that includes an inorganic ion,
an inorganic nanoparticle production step in which the inorganic ion is reduced by the catechol groups of segments represented by m of the multilayered structure and inorganic nanoparticles are produced in microlayers that include segments represented by m.

13. A block copolymer including
a hydrophilic segment including a catechol group,
a hydrophobic segment including a substitution more hydrophobic than the hydrophilic segment including a catechol group,
and,
a hydrophilic segment including a functional group having an acid dissociation constant pKa of from 0.5 to 7,
in which the hydrophilic segment including the functional group having an acid dissociation constant pKa of from 0.5 to 7 is adjacent to the hydrophilic segment including the catechol group.

14. The block copolymer according to claim 13, wherein the acid dissociation constant pKa is from 0.5 to 4.

15. A multilayered structure in which the hydrophilic segments and hydrophobic segments of the block copolymer according to claim 13 have a microlayer-separated layer structure.

16. The multilayered structure according to claim 15, wherein a thickness of the multilayered structure is from 20 nm to 500 nm.

17. The multilayered structure according to claim 15, wherein microlayers having hydrophilic segments include inorganic nanoparticles.

18. The multilayered structure according to claim 17, wherein the hydrophilic segments include a catechol group and quinone.

19. A solid polymer membrane for a separator of a fuel cell including the multilayered structure according to claim 15.

20. A fuel cell including the solid polymer membrane according to claim 19, an anode electrode, and a cathode electrode.

21. The block copolymer according to claim 1, wherein $R_2$ does not include a catechol group.

22. A multilayered structure wherein the hydrophilic segments represented by m and n and the hydrophobic segment represented by t of the block copolymer according to claim 21 have a microlayer-separated layer structure.

23. The multilayered structure according to claim 22, wherein the microlayers having hydrophilic segments include inorganic nanoparticles.

24. A solid polymer membrane for a separator of a fuel cell including the multilayered structure according to claim 23.

25. A fuel cell including the solid polymer membrane according to claim 24, an anode electrode, and a cathode electrode.

26. The method for producing the multilayered structure according to claim 10, wherein $R_2$ does not include a catechol group.

27. A method for producing a multilayered structure including inorganic nanoparticles that includes
- an immersion step for immersing a multilayered structure produced by the production method according to claim 26 in a solution that includes an inorganic ion,
- an inorganic nanoparticle production step in which the inorganic ion is reduced by the catechol groups of segments represented by m of the multilayered structure and inorganic nanoparticles are produced in microlayers that include segments represented by m.

* * * * *